(12) United States Patent
Kojima

(10) Patent No.: US 12,222,248 B2
(45) Date of Patent: Feb. 11, 2025

(54) DETECTION SYSTEM, DETECTION METHOD, AND DETECTION DEVICE

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 349 days.

(21) Appl. No.: 17/763,363

(22) PCT Filed: Sep. 30, 2019

(86) PCT No.: PCT/JP2019/038524
§ 371 (c)(1),
(2) Date: Mar. 24, 2022

(87) PCT Pub. No.: WO2021/064797
PCT Pub. Date: Apr. 8, 2021

(65) Prior Publication Data
US 2022/0334006 A1    Oct. 20, 2022

(51) Int. Cl.
*G01K 11/32* (2021.01)
*G01D 21/02* (2006.01)
*G01L 1/24* (2006.01)

(52) U.S. Cl.
CPC .............. *G01K 11/32* (2013.01); *G01D 21/02* (2013.01); *G01L 1/242* (2013.01)

(58) Field of Classification Search
CPC ......... G01K 11/32; G01D 21/02; G01L 1/242
See application file for complete search history.

(56) References Cited

U.S. PATENT DOCUMENTS

| | | | | |
|---|---|---|---|---|
| 7,508,304 B2* | 3/2009 | Swanson | ............... | G08B 21/086 340/541 |
| 8,398,546 B2* | 3/2013 | Pacione | ................ | A61B 5/1118 128/920 |
| 9,000,918 B1* | 4/2015 | McLaughlin | .......... | G08B 13/12 340/541 |

(Continued)

FOREIGN PATENT DOCUMENTS

| | | | |
|---|---|---|---|
| JP | H10-267707 A | | 10/1998 |
| JP | 2001-066117 A | | 3/2001 |

(Continued)

OTHER PUBLICATIONS

Duckworth et al., OptaSense distributed acoustic and seismic sensing using COTS fiber optic cables for Infrastructure Protection and Counter Terrorism, Proc. of SPIE vol. 8711 87110G-1, 2013 (Year: 2013).*

(Continued)

*Primary Examiner* — Peter Radkowski

(57) ABSTRACT

A detection system according to the present disclosure includes an optical fiber (10) configured to detect environment information, an acquisition unit (21) configured to acquire the environment information included in an optical signal received from the optical fiber (10), and a detection unit (22) configured to detect an event in the vicinity of the optical fiber (10) on the basis of a first environment pattern based on environment information acquired from an optical signal associated to a first period and a second environment pattern based on environment information acquired from an optical signal associated to a second period.

12 Claims, 28 Drawing Sheets

(56) References Cited

U.S. PATENT DOCUMENTS

| | | | |
|---|---|---|---|
| 9,268,938 B1* | 2/2016 | Aguayo Gonzalez | ........................ G06F 21/755 |
| 9,411,009 B1* | 8/2016 | Aguayo Gonzalez | . G01R 21/00 |
| 10,157,278 B2* | 12/2018 | Aguayo Gonzalez | .. G06F 21/32 |
| 10,247,584 B2* | 4/2019 | Crickmore | ......... G01D 5/35361 |
| 2005/0113650 A1* | 5/2005 | Pacione | ................. A61B 5/165 600/300 |
| 2006/0197665 A1 | 9/2006 | Shibata et al. | |
| 2007/0008123 A1* | 1/2007 | Swanson | .............. G08B 13/122 340/541 |
| 2009/0195401 A1* | 8/2009 | Maroney | ................ G06V 20/52 340/686.6 |
| 2010/0290734 A1 | 11/2010 | Kaplan et al. | |
| 2014/0330094 A1* | 11/2014 | Pacione | ................. G09B 19/00 600/300 |
| 2015/0339946 A1* | 11/2015 | Pacione | ............... A61B 5/1118 434/236 |
| 2016/0342791 A1* | 11/2016 | Aguayo Gonzalez | .. G06F 21/32 |
| 2017/0074688 A1* | 3/2017 | Crickmore | ......... G01K 11/3206 |
| 2018/0031428 A1 | 2/2018 | Uno et al. | |

FOREIGN PATENT DOCUMENTS

| | | |
|---|---|---|
| JP | 2002-140774 A | 5/2002 |
| JP | 2005-257570 A | 9/2005 |
| JP | 2006-208061 A | 8/2006 |
| JP | 2007-198973 A | 8/2007 |
| JP | 2017-220981 A | 12/2017 |
| JP | 2018-190428 A | 11/2018 |

OTHER PUBLICATIONS

Ku et al., Tracking a human walker with a fiber optic distributed acoustic sensor, Proceedings of Meetings on Acoustics, vol. 19, 070053 (2013) (Year: 2013).*

Cheng et al., Dynamic load monitoring of a concrete bridge using a fiber optic Distributed Acoustic Sensing (DAS) system, SMAR 2019—Fifth Conference on Smart Monitoring, Assessment and Rehabilitation of Civil Structures (Year: 2019).*

JP Office Action for JP Application No. 2021-550756, mailed on Jun. 13, 2023 with English Translation.

International Search Report for PCT Application No. PCT/JP2019/038524, mailed on Nov. 5, 2019.

* cited by examiner

FIRST PERIOD

| RECEPTION TIMING OF OPTICAL SIGNAL | ENVIRONMENT INFORMATION (VIBRATION (nm)) |
|---|---|
| t1 | 5~10 |
| t2 | 2~7 |
| t3 | 10~30 |

SECOND PERIOD

| RECEPTION TIMING OF OPTICAL SIGNAL | ENVIRONMENT INFORMATION (VIBRATION (nm)) |
|---|---|
| t4 | 7~20 |
| t5 | 8~15 |
| t6 | 13~35 |

Fig. 3

FIRST PERIOD

| TRANSMISSION TIMING OF OPTICAL SIGNAL | ENVIRONMENT INFORMATION (VIBRATION (nm)) |
|---|---|
| t1 | 5~10 |
| t2 | 2~7 |
| t3 | 10~30 |

SECOND PERIOD

| TRANSMISSION TIMING OF OPTICAL SIGNAL | ENVIRONMENT INFORMATION (VIBRATION (nm)) |
|---|---|
| t4 | 7~20 |
| t5 | 8~15 |
| t6 | 13~35 |

Fig. 4

| DISTANCE FROM DETECTION DEVICE IN OPTICAL FIBER | SECTION |
|---|---|
| A~B km | A |
| B~C km | B |
| C~D km | C |
| D~E km | D |

Fig. 9

FIRST PERIOD (ONE DAY, HALF A DAY, ETC)

| RECEPTION TIMING OF OPTICAL SIGNAL | ENVIRONMENT INFORMATION (VIBRATION (nm)) |
|---|---|
| t1 | 5~10 |
| t2 | 2~7 |
| t3 | 10~30 |

SECOND PERIOD (ONE DAY, HALF A DAY, ETC)

| RECEPTION TIMING OF OPTICAL SIGNAL | ENVIRONMENT INFORMATION (VIBRATION (nm)) |
|---|---|
| t4 | 7~20 |
| t5 | 8~15 |
| t6 | 13~35 |

Fig. 13

FIRST PERIOD (30 MINUTES, 10 MINUTES, ETC)

| RECEPTION TIMING OF OPTICAL SIGNAL | ENVIRONMENT INFORMATION (VIBRATION (nm)) |
|---|---|
| t1 | 4~11 |
| t2 | 3~8 |
| t3 | 9~12 |

SECOND PERIOD (30 MINUTES, 10 MINUTES, ETC)

| RECEPTION TIMING OF OPTICAL SIGNAL | ENVIRONMENT INFORMATION (VIBRATION (nm)) |
|---|---|
| t4 | 6~8 |
| t5 | 10~15 |
| t6 | 8~20 |

Fig. 14

FIRST PERIOD (ONE WEEK, ONE DAY, ETC)

| RECEPTION TIMING OF OPTICAL SIGNAL | ENVIRONMENT INFORMATION (VIBRATION (nm)) |
|---|---|
| t1 | 7~13 |
| t2 | 4~8 |
| t3 | 9~11 |

SECOND PERIOD (ONE WEEK, ONE DAY, ETC)

| RECEPTION TIMING OF OPTICAL SIGNAL | ENVIRONMENT INFORMATION (VIBRATION (nm)) |
|---|---|
| t4 | 11~13 |
| t5 | 10~14 |
| t6 | 8~20 |

Fig. 17

| FIRST PERIOD (ONE WEEK, ONE DAY, ETC) | |
|---|---|
| RECEPTION TIMING OF OPTICAL SIGNAL | ENVIRONMENT INFORMATION (TEMPERATURE (°C)) |
| t1 | 20~24 |
| t2 | 23~25 |
| t3 | 19~21 |

| SECOND PERIOD (ONE WEEK, ONE DAY, ETC) | |
|---|---|
| RECEPTION TIMING OF OPTICAL SIGNAL | ENVIRONMENT INFORMATION (TEMPERATURE (°C)) |
| t4 | 21~23 |
| t5 | 25~27 |
| t6 | 22~25 |

Fig. 18

| DISTANCE FROM DETECTION DEVICE IN OPTICAL FIBER | REGION |
|---|---|
| A~B km | A |
| B~C km | B |
| C~D km | C |
| D~E km | D |

Fig. 20

FIRST PERIOD (ONE WEEK, ONE DAY, ETC)

UPPER REGION (REGION A)

| RECEPTION TIMING OF OPTICAL SIGNAL | ENVIRONMENT INFORMATION (PRESSURE (nPa)) |
|---|---|
| t1 | 11~23 |
| t2 | 14~18 |
| t3 | 20~22 |

LOWER REGION (REGION B)

| RECEPTION TIMING OF OPTICAL SIGNAL | ENVIRONMENT INFORMATION (PRESSURE (nPa)) |
|---|---|
| t1 | 8~14 |
| t2 | 5~10 |
| t3 | 9~11 |

SECOND PERIOD (ONE WEEK, ONE DAY, ETC)

UPPER REGION (REGION A)

| RECEPTION TIMING OF OPTICAL SIGNAL | ENVIRONMENT INFORMATION (PRESSURE (nPa)) |
|---|---|
| t4 | 10~20 |
| t5 | 9~15 |
| t6 | 14~16 |

LOWER REGION (REGION B)

| RECEPTION TIMING OF OPTICAL SIGNAL | ENVIRONMENT INFORMATION (PRESSURE (nPa)) |
|---|---|
| t4 | 10~24 |
| t5 | 14~20 |
| t6 | 11~13 |

Fig. 21

FIRST PERIOD (ONE HOUR, 30 minutes, ETC)

| RECEPTION TIMING OF OPTICAL SIGNAL | ENVIRONMENT INFORMATION (PRESSURE (nPa)) |
|---|---|
| t1 | 8~11 |
| t2 | 3~6 |
| t3 | 3~9 |

SECOND PERIOD (ONE HOUR, 30 MINUTES, ETC)

| RECEPTION TIMING OF OPTICAL SIGNAL | ENVIRONMENT INFORMATION (PRESSURE (nPa)) |
|---|---|
| t4 | 5~11 |
| t5 | 7~8 |
| t6 | 9~10 |

Fig. 23

| FIRST PERIOD (ONE HOUR, 30 minutes, ETC) | |
|---|---|
| RECEPTION TIMING OF OPTICAL SIGNAL | ENVIRONMENT INFORMATION (PRESSURE (nPa)) |
| t1 | 11~13 |
| t2 | 10~16 |
| t3 | 13~18 |

| SECOND PERIOD (ONE HOUR, 30 MINUTES, ETC) | |
|---|---|
| RECEPTION TIMING OF OPTICAL SIGNAL | ENVIRONMENT INFORMATION (PRESSURE (nPa)) |
| t4 | 14~20 |
| t5 | 18~22 |
| t6 | 16~20 |

Fig. 25

| FIRST PERIOD (ONE HOUR, 30 minutes, ETC) | |
| --- | --- |
| RECEPTION TIMING OF OPTICAL SIGNAL | ENVIRONMENT INFORMATION (VIBRATION (nm)) |
| t1 | 15~18 |
| t2 | 13~17 |
| t3 | 12~19 |

| SECOND PERIOD (ONE HOUR, 30 MINUTES, ETC) | |
| --- | --- |
| RECEPTION TIMING OF OPTICAL SIGNAL | ENVIRONMENT INFORMATION (VIBRATION (nm)) |
| t4 | 10~14 |
| t5 | 8~10 |
| t6 | 11~15 |

Fig. 26

DETECTION SYSTEM, DETECTION METHOD, AND DETECTION DEVICE

This application is a National Stage Entry of PCT/JP2019/038524 filed on Sep. 30, 2019, the contents of all of which are incorporated herein by reference, in their entirety.

TECHNICAL FIELD

The present disclosure relates to a detection system, a detection method, and a detection device.

BACKGROUND ART

As a technique related to optical fiber sensing, there is a technique of detecting an event occurring in the vicinity of an optical fiber based on intensity of an optical signal received from the optical fiber.

For example, a technique disclosed in Patent Literature 1 monitors an optical signal from an optical fiber mounted on a fence, and specifies that there is an intrusion act when intensity of the optical signal exceeds a preset threshold continuously for a predetermined period of time.

CITATION LIST

Patent Literature

Japanese Unexamined Patent Application Publication No. 2007-198973

SUMMARY OF INVENTION

Technical Problem

However, the technique described in Patent Literature 1 is suitable for detecting an instantaneously determinable event such as climbing over a fence, but has difficulty in accurately detecting an event in which a situation gradually changes over a long period of time (for example, tunnel excavation in the underground, deterioration of pipelines, or the like).

For example, when the technique described in Patent Literature 1 is adopted in order to detect tunnel excavation, the tunnel excavation may be erroneously detected due to an influence of an event that does not directly contribute to the tunnel excavation (for example, construction that occurs in the vicinity of an optical fiber and the like).

An object of the present disclosure is to solve the aforementioned problems and to provide a detection system, a detection method, and a detection device that are able to more accurately detect an event in the vicinity of an optical fiber by optical fiber sensing.

Solution to Problem

A detection system according to one aspect includes:
an optical fiber configured to detect environment information;
an acquisition unit configured to acquire the environment information being included in an optical signal received from the optical fiber; and
a detection unit configured to detect an event in the vicinity of the optical fiber on the basis of a first environment pattern based on environment information acquired from an optical signal associated to a first period and a second environment pattern based on environment information acquired from an optical signal associated to a second period.

A detection method according to one aspect includes:
an acquisition step of acquiring environment information being included in an optical signal received from an optical fiber that detects the environment information; and
a detection step of detecting an event in the vicinity of the optical fiber on the basis of a first environment pattern based on environment information acquired from an optical signal associated to a first period and a second environment pattern based on environment information acquired from an optical signal associated to a second period.

A detection device according to one aspect includes:
an acquisition unit configured to acquire environment information being included in an optical signal received from an optical fiber that detects the environment information; and
a detection unit configured to detect an event in the vicinity of the optical fiber on the basis of a first environment pattern based on environment information acquired from an optical signal associated to a first period and a second environment pattern based on environment information acquired from an optical signal associated to a second period.

Advantageous Effects of Invention

According to the aforementioned aspects, it is possible to provide a detection system, a detection method, and a detection device that are able to more accurately detect an event in the vicinity of an optical fiber by optical fiber sensing.

BRIEF DESCRIPTION OF DRAWINGS

FIG. 3 is a diagram illustrating a specific example of an environment pattern generation operation performed by the acquisition unit according to the first example embodiment.

FIG. 4 is a diagram illustrating a specific example of an environment pattern generation operation performed by the acquisition unit according to the first example embodiment.

FIG. 9 is a diagram illustrating an example of a correspondence table held by an acquisition unit according to the second example embodiment.

FIG. 13 is a diagram illustrating a specific example of an environment pattern generation operation performed by an acquisition unit according to the third example embodiment.

FIG. 14 is a diagram illustrating a specific example of an environment pattern generation operation performed by the acquisition unit according to the third example embodiment.

FIG. 17 is a diagram illustrating a specific example of an environment pattern generation operation performed by an acquisition unit according to the fourth example embodiment.

FIG. 18 is a diagram illustrating a specific example of an environment pattern generation operation performed by the acquisition unit according to the fourth example embodiment.

FIG. 20 is a diagram illustrating an example of a correspondence table held by an acquisition unit according to the fifth example embodiment.

FIG. 21 is a diagram illustrating a specific example of an environment pattern generation operation performed by the acquisition unit according to the fifth example embodiment.

FIG. 23 is a diagram illustrating a specific example of an environment pattern generation operation performed by the acquisition unit according to the sixth example embodiment.

FIG. 25 is a diagram illustrating a specific example of an environment pattern generation operation performed by an acquisition unit according to the seventh example embodiment.

FIG. 26 is a diagram illustrating a specific example of an environment pattern generation operation performed by the acquisition unit according to the seventh example embodiment.

DESCRIPTION OF EMBODIMENTS

Figure 1:
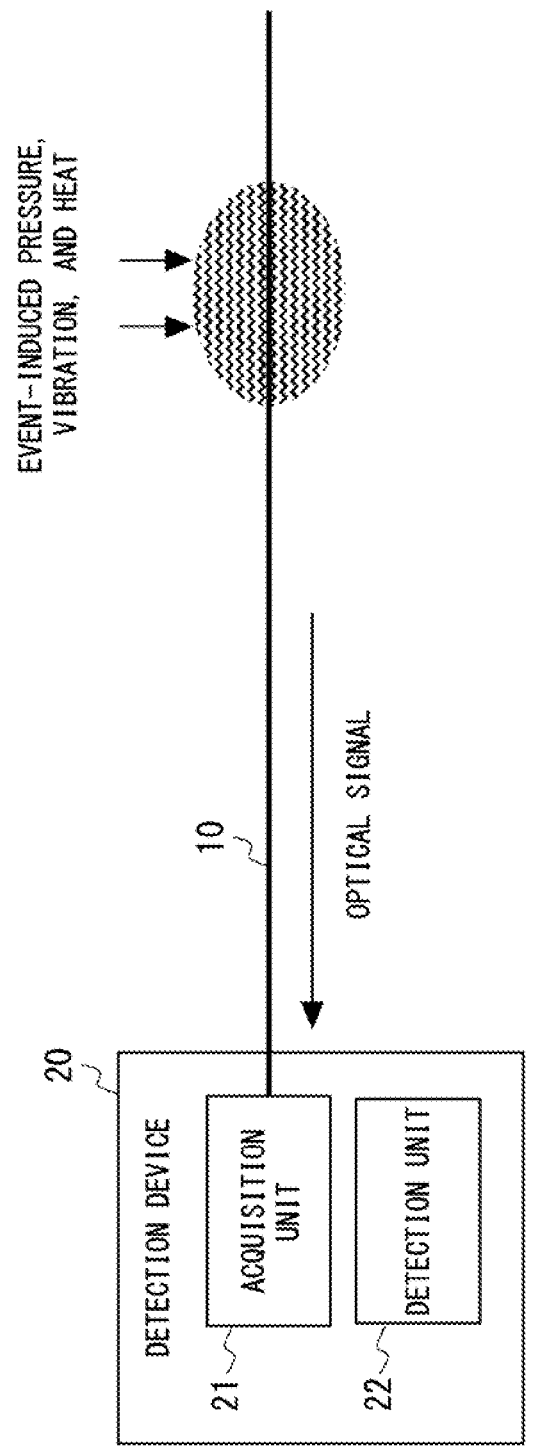
FIG. 1 is a diagram illustrating a configuration example of a detection system according to a first example embodiment.

Hereinafter, example embodiments of the present disclosure will be described with reference to the drawings. The specific numerical values and the like described in the following example embodiments are merely examples for facilitating the understanding of the present disclosure and are not limited thereto. Furthermore, the following descriptions and drawings have been appropriately omitted and simplified in order to clarify description. Furthermore, in each of the following drawings, the same components are given the same reference numerals and redundant description thereof is omitted as needed.

First Example Embodiment

First, a configuration example of a detection system according to the present first example embodiment will be described with reference to FIG. 1.

As illustrated in FIG. 1, the detection system according to the present first example embodiment includes an optical fiber 10 and a detection device 20. The detection device 20 includes an acquisition unit 21 and a detection unit 22.

The optical fiber 10 is an optical fiber for optical fiber sensing, and has one end connected to the acquisition unit 21 of the detection device 20.

When optical fiber sensing is performed, the acquisition unit 21 transmits pulsed lights to the optical fiber 10, and receives, as optical signals, backscattered lights generated as the pulsed lights are transmitted through the optical fiber 10.

When a certain event occurs in the vicinity of the optical fiber 10, event-induced heat, vibration, pressure, and the like are applied to the optical fiber 10. This causes a change in the temperature of the optical fiber 10, the vibration of the optical fiber 10, and pressure applied to the optical fiber 10, resulting in a change in the characteristics of an optical signal transmitted through the optical fiber 10. For example, when vibration applied to the optical fiber 10 is changed, the wavelength of the optical signal transmitted through the optical fiber 10 is changed. Therefore, the optical fiber 10 can detect environment information indicating the temperature of the optical fiber 10, the vibration of the optical fiber 10, pressure applied to the optical fiber 10, and the like. The environment information indicates at least one of the temperature of the optical fiber 10, the vibration of the optical fiber 10, and the pressure applied to the optical fiber 10. Furthermore, the optical signal transmitted through the optical fiber 10 includes the environment information detected by the optical fiber 10 because the characteristics of the optical signal are changed according to the environment information detected by the optical fiber 10.

Figure 2:
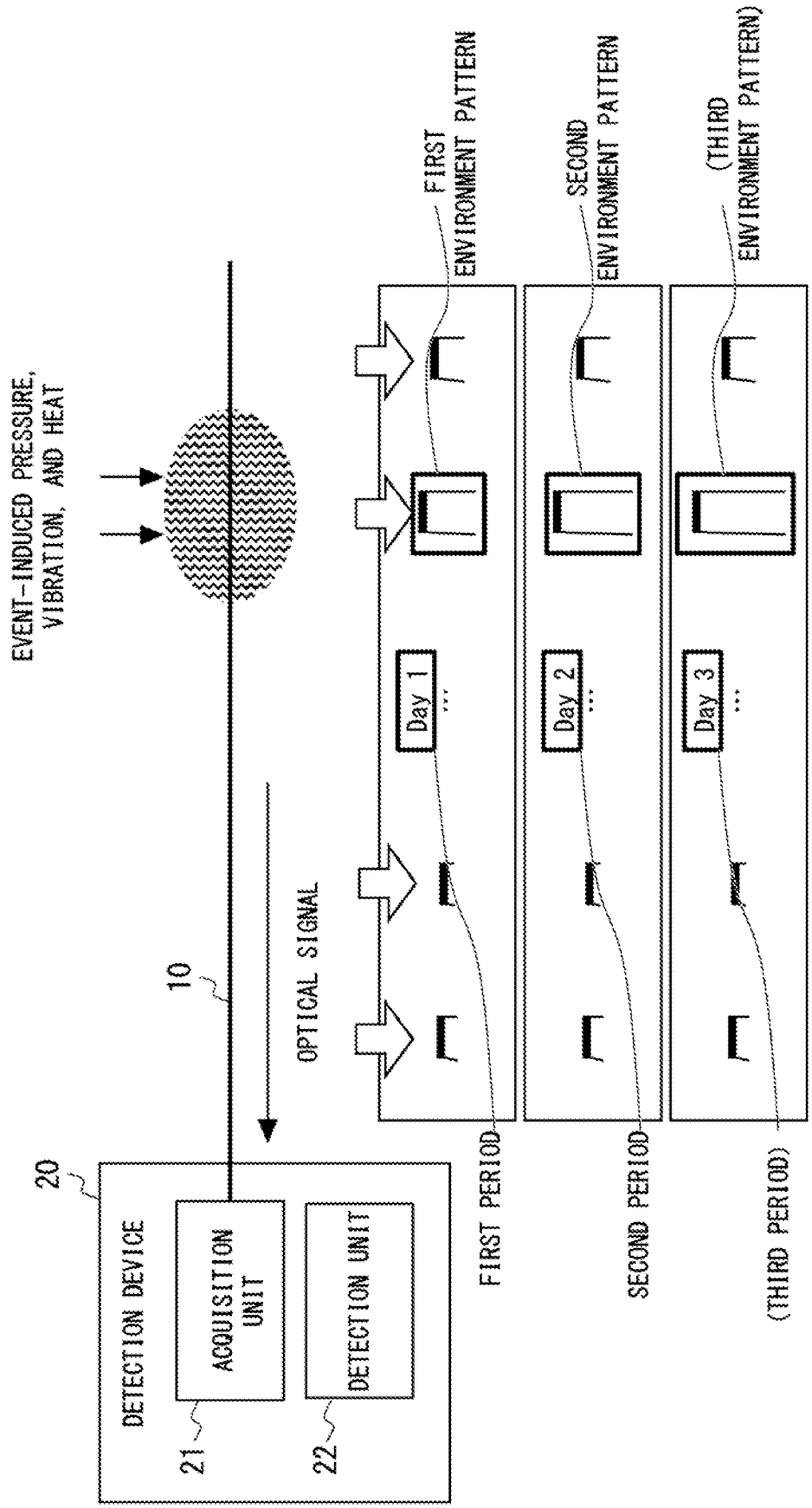
FIG. 2 is a diagram illustrating an example of an environment pattern generation operation performed by an acquisition unit according to the first example embodiment.

Accordingly, as illustrated in FIG. 2, the acquisition unit 21 sequentially acquires environment information included in an optical signal received from the optical fiber 10.

Then, the acquisition unit 21 accumulates a plurality of pieces of environment information acquired in a first period (Day1 in the example of FIG. 2), and generates a first environment pattern on the basis of the plurality of pieces of accumulated environment information. For example, the acquisition unit 21 generates the first environment pattern by integrating the plurality of pieces of environment information acquired in the first period.

Similarly, the acquisition unit 21 accumulates a plurality of pieces of environment information acquired in a second period (Day2 in the example of FIG. 2), and generates a second environment pattern on the basis of the plurality of pieces of accumulated environment information. For example, the acquisition unit 21 generates the second environment pattern by integrating the plurality of pieces of environment information acquired in the second period.

The first period and the second period are set to the same time as each other. This time has a fixed duration. In the example of FIG. 2, the first period and the second period are set to one day, but are not limited to this, and may be, for example, one week, half a day (12 hours), one hour, or the like.

The detection unit 22 detects an event in the vicinity of the optical fiber 10 on the basis of the first environment pattern in the first period and the second environment pattern in the second period.

More specifically, the detection unit 22 compares the first environment pattern and the second environment pattern, and detects an event in the vicinity of the optical fiber 10 on the basis of a displacement between the first environment pattern and the second environment pattern. For example, when the displacement between the first environment pattern and the second environment pattern satisfies a predetermined condition, the detection unit 22 detects an event associated to the condition. For example, the detection unit 22 detects an abnormality when the displacement indicates an increase in vibration.

Subsequently, hereinafter, a specific example of the environment pattern generation operation performed by the acquisition unit 21 and the environment pattern comparison operation performed by the detection unit 22 will be described with reference to FIG. 3. In the example of FIG. 3, environment information indicating the magnitude [nm] of vibration of the optical fiber 10 is used.

(A-1) Specific Example of Environment Pattern Generation Operation Performed by Acquisition Unit 21

As illustrated in FIG. 3, the acquisition unit 21 acquires, in the first period, three pieces of environment information respectively correlated with reception timings t1, t2, and t3 at which optical signals have been received from the optical fiber 10. Specifically, the acquisition unit 21 acquires three pieces of environment information from three optical signals, which are respectively received from the optical fiber 10 at the reception timings t1, t2, and t3, respectively. Then, the acquisition unit 21 generates a first environment pattern on the basis of the acquired three pieces of environment information. For example, the acquisition unit 21 uses any one of a minimum value (=2 nm), a maximum value (=30 nm), an average value (=5.7 nm) of the minimum values, or an average value (=15.7 nm) of the maximum values of the three pieces of environment information as the first environment pattern. However, the present disclosure is not limited thereto, and the first environment pattern may be a median value of the three pieces of environment information, an average value of the whole, or the like.

Similarly in the second period, the acquisition unit 21 acquires three pieces of environment information respectively correlated with reception timings t4, t5, and t6 at which optical signals have been received from the optical fiber 10. Then, the acquisition unit 21 generates a second environment pattern on the basis of the acquired three pieces of environment information. The second environment pattern is generated in the same generation method as that of the first environment pattern.

(A-2) Specific Example of Environment Pattern Comparison Operation Performed by Detection Unit 22

In the example of FIG. 3, it is assumed that minimum values of the three pieces of environment information are used as the first environment pattern and the second environment pattern. In such a case, the first environment pattern is 2 nm, while the second environment pattern is 7 nm.

The detection unit 22 compares the first environment pattern and the second environment pattern. As a result of the comparison, a displacement between the first environment pattern and the second environment pattern shows an increasing tendency of vibration. Therefore, the detection unit 22 detects an abnormality.

Figure 5:
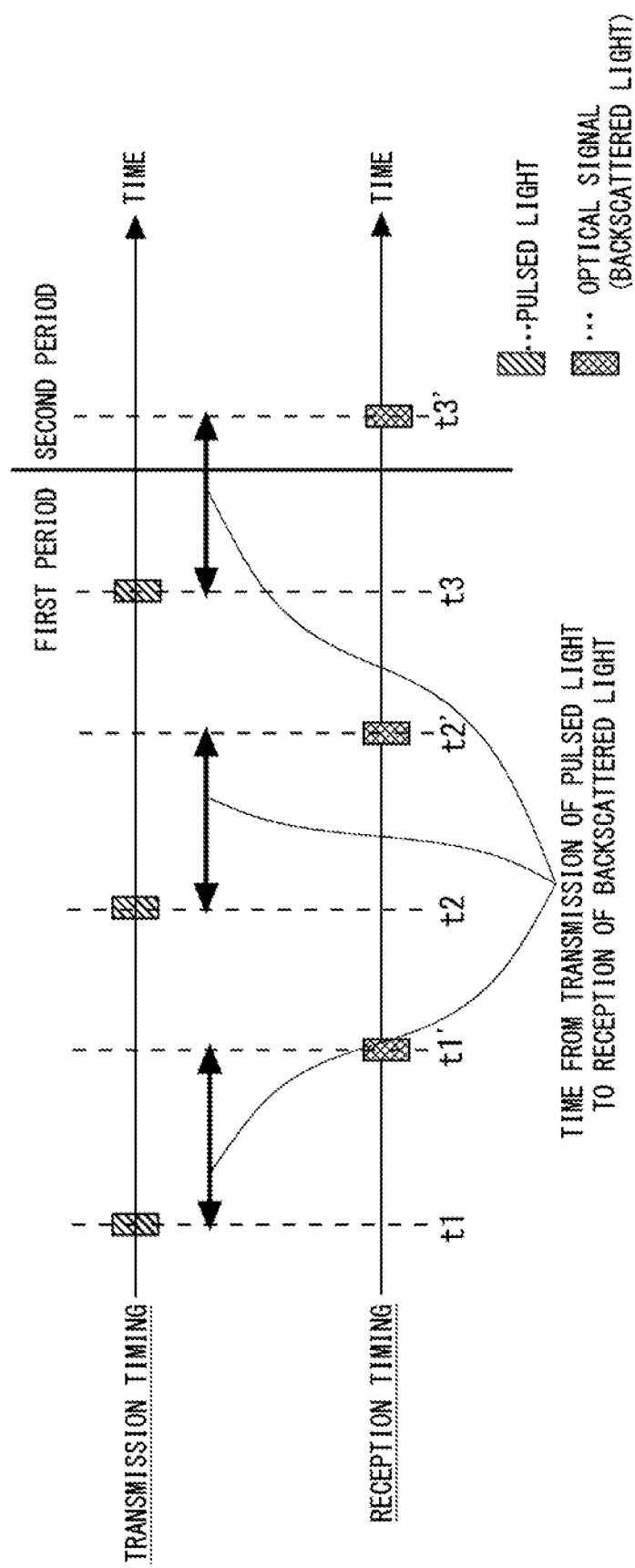
FIG. 5 is a diagram illustrating an example of the relationship between transmission timings of pulsed lights and reception timings of optical signals (backscattered lights) in the acquisition unit according to the first example embodiment.

In the example of FIG. 3, environment patterns are generated on the basis of environment information correlated with reception timings at which optical signals (backscattered light) have been received from the optical fiber 10; however, the present disclosure is not limited thereto. The environment information may be correlated with transmission timings at which pulsed lights have been transmitted to the optical fiber 10. For example, as illustrated in FIG. 4, the environment information may be three pieces of environment information respectively correlated with transmission timings t1, t2, and t3 at which pulsed lights have been transmitted to the optical fiber 10, in the first period. Furthermore, the environment information may be three pieces of environment information respectively correlated with transmission timings t4, t5, and t6 at which pulsed lights have been transmitted to the optical fiber 10, in the second period. As illustrated in FIG. 5, for example, in the first period, optical signals associated to three pulsed lights transmitted to the optical fiber 10 at the transmission timings t1, t2, and t3 are three optical signals received from the optical fiber 10 at reception timings t1', t2', and t3'. Therefore, the acquisition unit 21 acquires three pieces of environment information from the three optical signals received at the reception timings t1', t2', and t3', respectively. In the example of FIG. 5, an optical signal associated to the pulsed light transmitted at the transmission timing t3 is an optical signal received from the optical fiber 10 at the reception timing t3', but the reception timing t3' belongs to the second period. However, even in such a case, the acquisition unit 21 acquires environment information correlated with the transmission timing t3, as the environment information in the first period.

Subsequently, hereinafter, an example of the flow of an overall operation of the detection system according to the present first example embodiment will be described with reference to FIG. 6.

Figure 6:
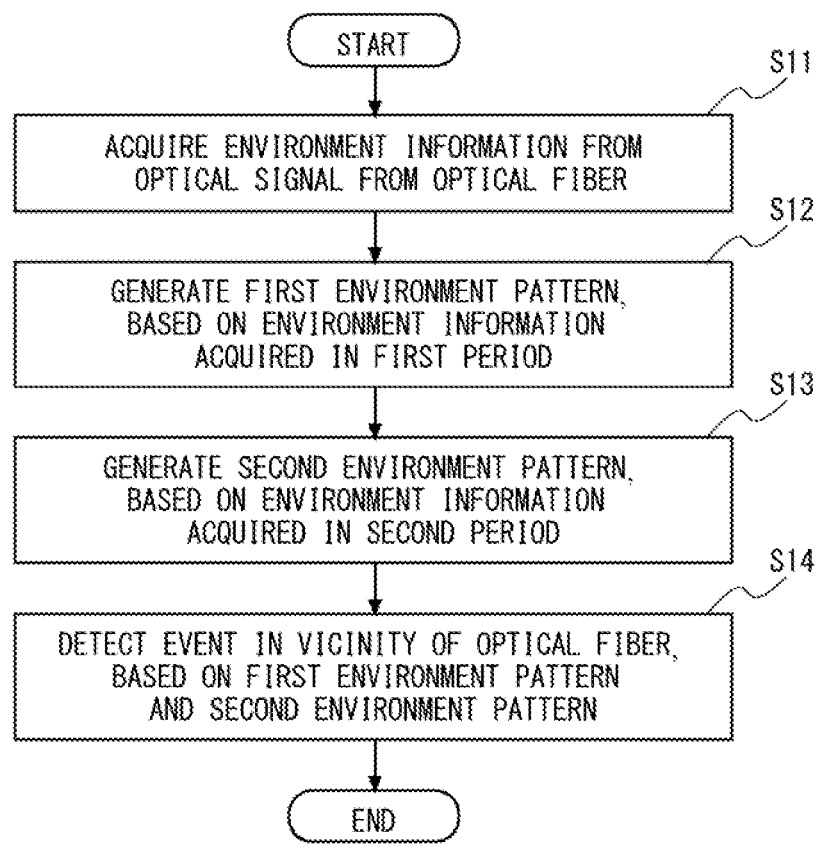
FIG. 6 is a flowchart illustrating an example of the flow of an overall operation of the detection system according to the first example embodiment.

As illustrated in FIG. 6, the acquisition unit 21 acquires environment information from optical signals received from the optical fiber 10 (step S11).

Then, the acquisition unit 21 generates the first environment pattern on the basis of the environment information acquired in the first period (step S12).

Similarly, the acquisition unit 21 generates the second environment pattern on the basis of the environment information acquired in the second period (step S13).

Subsequently, the detection unit 22 detects an event in the vicinity of the optical fiber 10 on the basis of the first environment pattern in the first period and the second environment pattern in the second period (step S14). This detection is performed, for example, on the basis of a displacement between the first environment pattern and the second environment pattern as described above.

As described above, according to the present first example embodiment, the acquisition unit 21 generates a first environment pattern on the basis of environment information acquired from optical signals in a first period and generates a second environment pattern on the basis of environment information acquired from optical signals in a second period. The detection unit 22 detects an event in the vicinity of the optical fiber 10 on the basis of the first environment pattern in the first period and the second environment pattern in the second period. In this way, an event in the vicinity of the optical fiber 10 is detected on the basis of the environment patterns in two periods different from each other, so that it is possible to accurately detect even an event in which its situation gradually changes over a long period of time. Consequently, it is possible to more accurately detect an event in the vicinity of the optical fiber 10 by optical fiber sensing.

Modification of First Example Embodiment

The acquisition unit 21 may additionally generate a third environment pattern (see FIG. 2) in a third period and a fourth environment pattern in a fourth period. That is, the acquisition unit 21 may generate three or more environment patterns in three or more periods. When three or more environment patterns are generated, a plurality of displacements are derived (for example, when three environment patterns are generated, three displacements are derived). Therefore, when the plurality of displacements satisfy a predetermined condition, the detection unit 22 may detect an event (abnormality) in the vicinity of the optical fiber 10.

Hereinafter, a procedure for detecting an event (abnormality) in the vicinity of the optical fiber 10 when three or more environment patterns are generated will be described in detail. For example, it is assumed that the acquisition unit 21 generates a first environment pattern in a first period, a second environment pattern in a second period, a third environment pattern in a third period, a fourth environment pattern in a fourth period, and a fifth environment pattern in a fifth period. In such an example, it is assumed that the respective periods pass in the order of the first period, the second period, the third period, the fourth period, and the fifth period. In such an example, a first displacement between the first environment pattern and the second environment pattern, a second displacement between the second environment pattern and the third environment pattern, a third displacement between the third environment pattern and the fourth environment pattern, and a fourth displacement between the fourth environment pattern and the fifth environment pattern are derived.

When all the derived displacements satisfy a predetermined condition (for example, when indicating an increase in vibration), the detection unit 22 detects an event (abnormality) in the vicinity of the optical fiber 10.

Furthermore, when a predetermined number or more of displacements among the derived displacements satisfy a predetermined condition, the detection unit 22 may detect an event (abnormality) in the vicinity of the optical fiber 10. For example, three or more of four displacements satisfy a predetermined condition, the detection unit 22 detects an event (abnormality) in the vicinity of the optical fiber 10. The predetermined number may be derived by an arbitrary ratio to the number of displacements.

In the above description, the first to fourth displacements are derived, but displacements to be derived are not limited thereto. For example, a fifth displacement between the first environment pattern and the third environment pattern may be derived.

Figure 7:
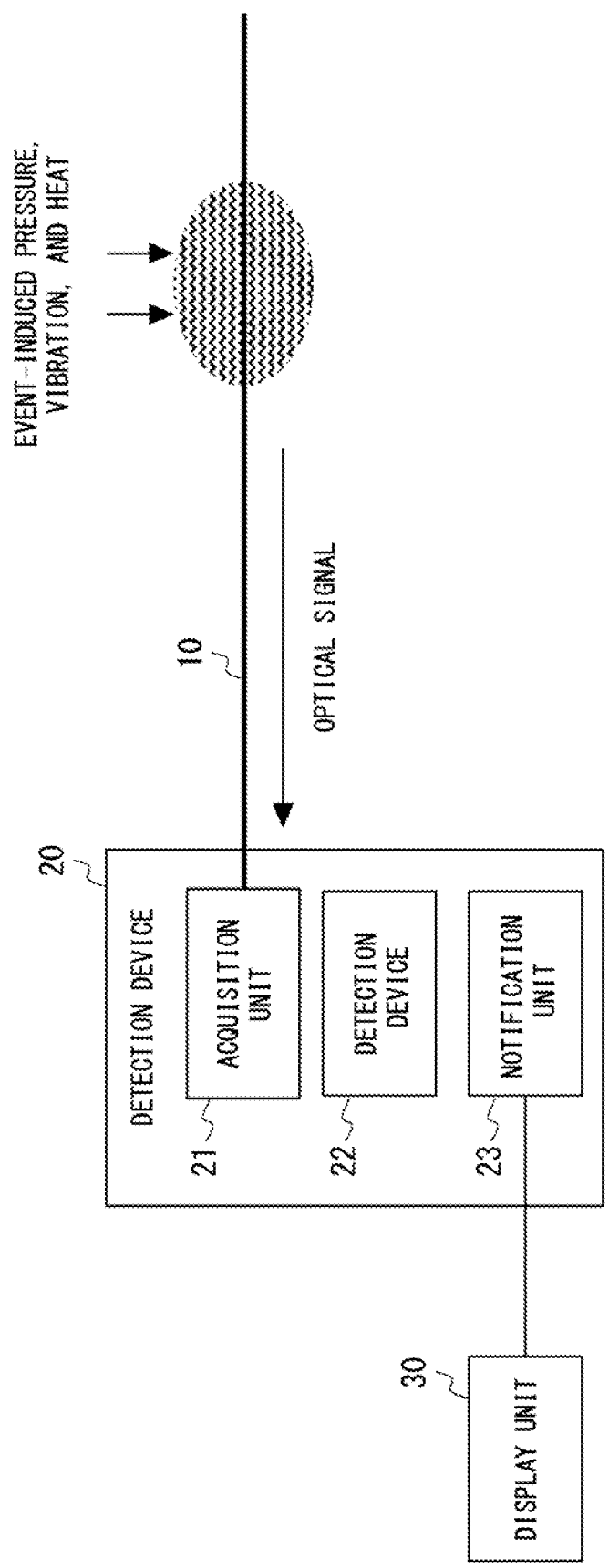
FIG. 7 is a diagram illustrating a modified configuration example of the detection system according to the first example embodiment.

Furthermore, as illustrated in FIG. 7, the detection device 20 may further include a notification unit 23.

The notification unit 23 notifies that the detection unit 22 has detected an event. Examples of the notification method of the notification unit 23 include a method for displaying a graphical user interface (GUI) screen on a display unit 30 such as a display or a monitor. In such a case, the display unit 30 may be provided in the same facility as that in which the detection device 20 is provided, or may be provided in another facility. The notification method of the notification unit 23 may be a method for outputting a message from a speaker (not illustrated) by voice.

Second Example Embodiment

A detection system according to the present second example embodiment has the same basic configuration as the first example embodiment described above, but the operation is different.

Figure 8:
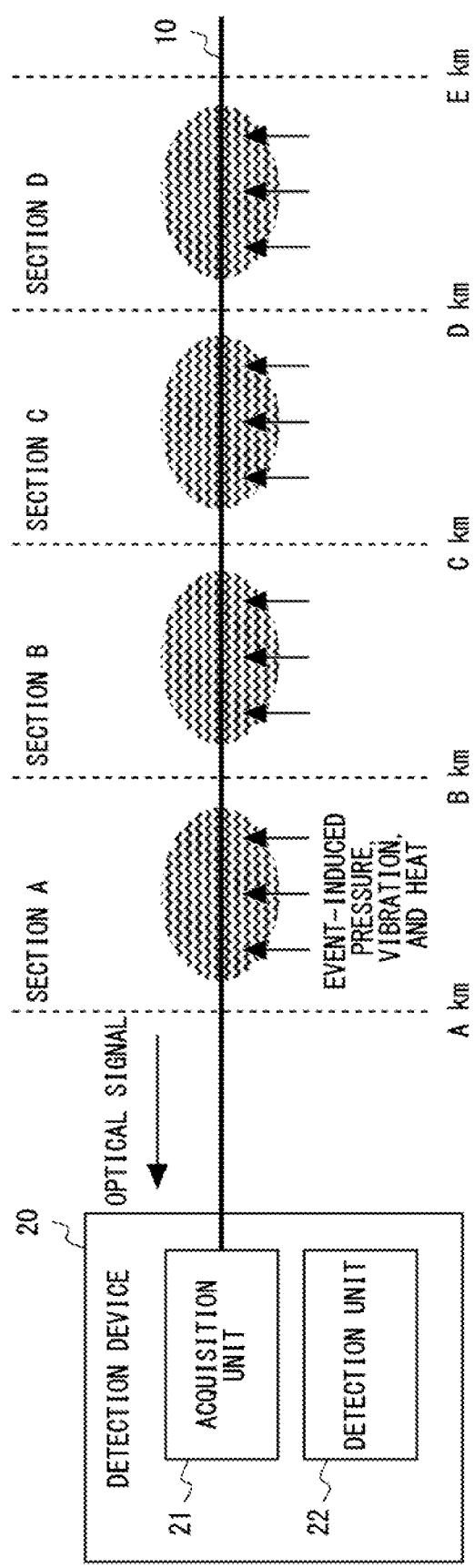
FIG. 8 is a diagram illustrating a configuration example of a detection system according to a second example embodiment.

As illustrated in FIG. 8, the detection system according to the present second example embodiment divides a section where the optical fiber 10 is laid into a plurality of sections (four sections from sections A to D in the example of FIG. 8), and detects an event in the vicinity of the optical fiber 10 for each section.

As illustrated in FIG. 9, the acquisition unit 21 holds in advance a correspondence table in which the distance from the detection device 20 in the optical fiber 10 and the sections are correlated with each other.

For example, on the basis of a time difference between transmitting pulsed lights to the optical fiber 10 and receiving optical signals (backscattered lights), the intensity of the received optical signals, and the like, the acquisition unit 21 can specify a position (distance from the detection device 20 in the optical fiber 10) on the optical fiber 10 where the optical signals have been generated.

Therefore, on the basis of the position on the optical fiber 10 where the optical signals have been generated and the correspondence table illustrated in FIG. 9, the acquisition unit 21 can specify a section on the optical fiber 10 to which environment information included in the optical signals belongs.

Accordingly, the acquisition unit 21 sequentially acquires, from optical signals received from a plurality of sections in the optical fiber 10, environment information included in optical signals of an associated section, for each section.

Then, the acquisition unit 21 accumulates, for each section, a plurality of pieces of environment information acquired in a first period, and generates a first environment pattern on the basis of the plurality of pieces of accumulated environment information.

Similarly, the acquisition unit 21 accumulates, for each section, a plurality of pieces of environment information acquired in a second period, and generates a second environment pattern on the basis of the plurality of accumulated environment information.

As in the first example embodiment described above, the first period and the second period are set to the same time as each other. This time has a fixed duration.

The detection unit 22 detects an event in the vicinity of the optical fiber 10 for each section on the basis of the first environment pattern in the first period and the second environment pattern in the second period.

More specifically, the detection unit 22 compares the first environment pattern and the second environment pattern for each section, and detects an event in the vicinity of the optical fiber 10 on the basis of a displacement between the first environment pattern and the second environment pattern. For example, in a certain section, when a displacement between the first environment pattern and the second environment pattern satisfies a predetermined condition, the detection unit 22 detects an event associated to the condition.

Subsequently, hereinafter, an example of the flow of an overall operation of the detection system according to the present second example embodiment will be described with reference to FIG. 10.

Figure 10:
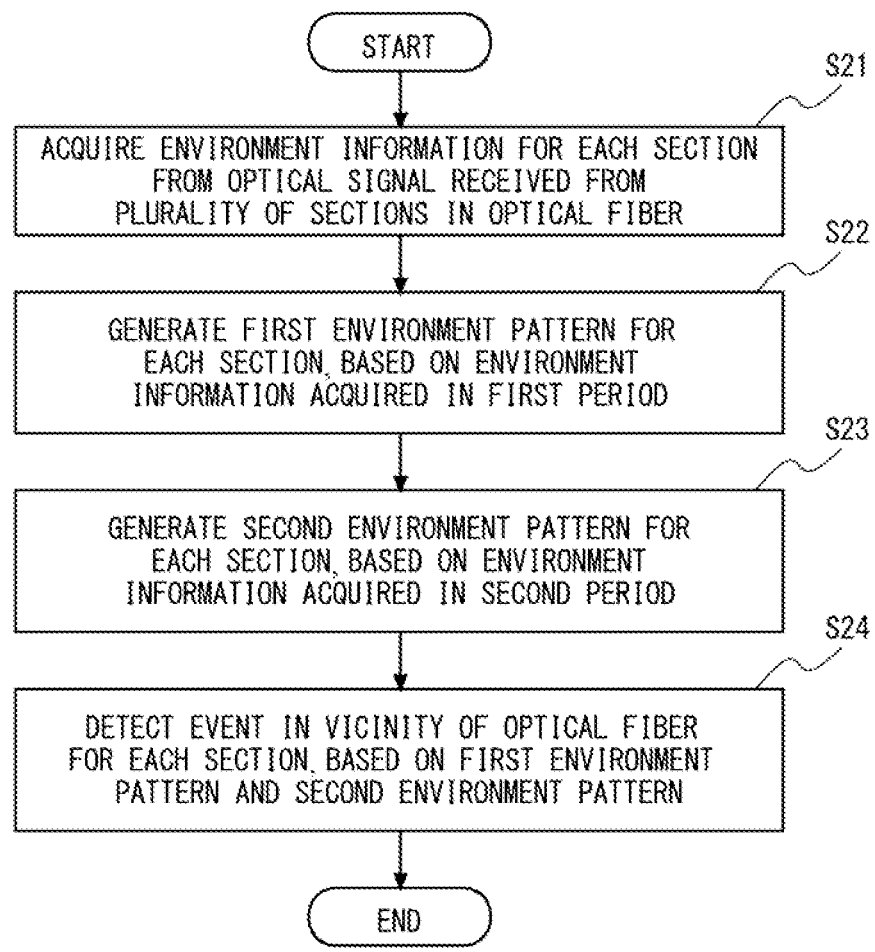
FIG. 10 is a flowchart illustrating an example of the flow of an overall operation of the detection system according to the second example embodiment.

As illustrated in FIG. 10, the acquisition unit 21 acquires, from optical signals received from a plurality of sections in the optical fiber 10, environment information for each section (step S21).

Then, the acquisition unit 21 generates the first environment pattern for each section on the basis of the environment information acquired in the first period (step S22).

Similarly, the acquisition unit 21 generates the second environment pattern for each section on the basis of the environment information acquired in the second period (step S23).

Subsequently, the detection unit 22 detects an event in the vicinity of the optical fiber 10 for each section on the basis of the first environment pattern in the first period and the second environment pattern in the second period (step S24). This detection is performed, for example, for each section on the basis of a displacement between the first environment pattern and the second environment pattern as described above.

As described above, according to the present second example embodiment, the acquisition unit 21 generates a first environment pattern in a first period and generates a second environment pattern in a second period, for each section. The detection unit 22 detects an event in the vicinity of the optical fiber 10 for each section on the basis of the first environment pattern in the first period and the second environment pattern in the second period. Consequently, it is possible to more accurately detect an event in the vicinity of the optical fiber 10 for each section.

Modification of Second Example Embodiment

Some sections may be monitored in a period of a shorter cycle as compared to other sections. For example, when it is desired to quickly detect an event in the section C, the acquisition unit 21 may generate an environment pattern every 12 hours only in the section C while generating an environment pattern every day in the sections A, B, and D. This makes it possible to detect an event in the section C earlier than other sections.

Furthermore, as a result of comparing, by the detection unit 22, a first environment pattern and a second environment pattern for each section, it is assumed that a displacement between the first environment pattern and the second environment pattern satisfies a predetermined condition in two or more sections. In such a case, it is conceivable that a section with the largest displacement is a section near a position where an event is occurring. Therefore, the detection unit 22 may specify a section with the largest displacement among two or more sections where the displacement satisfies the predetermined condition. This makes it possible to specify a section near a position where an event is occurring.

Furthermore, the detection unit 22 may detect an event by comparing displacements between the first environment pattern and the second environment pattern, which are derived for each section, with each other between the sections. For example, when an event is an intrusion act, the detection unit 22 can specify the movement direction of a position where the intrusion act has occurred, by comparing displacements derived for each section with each other between the sections (details will be described below).

As in the first example embodiment described above, the acquisition unit 21 may generate three or more environment patterns in three or more periods. In a case where three or more environment patterns are generated, since a plurality of displacements are derived, the detection unit 22 may detect an event (abnormality) in the vicinity of the optical fiber 10 when the plurality of displacements satisfy a predetermined condition.

Furthermore, as in the first example embodiment described above, as illustrated in FIG. 11, the detection device 20 may further include the notification unit 23.

Figure 11:
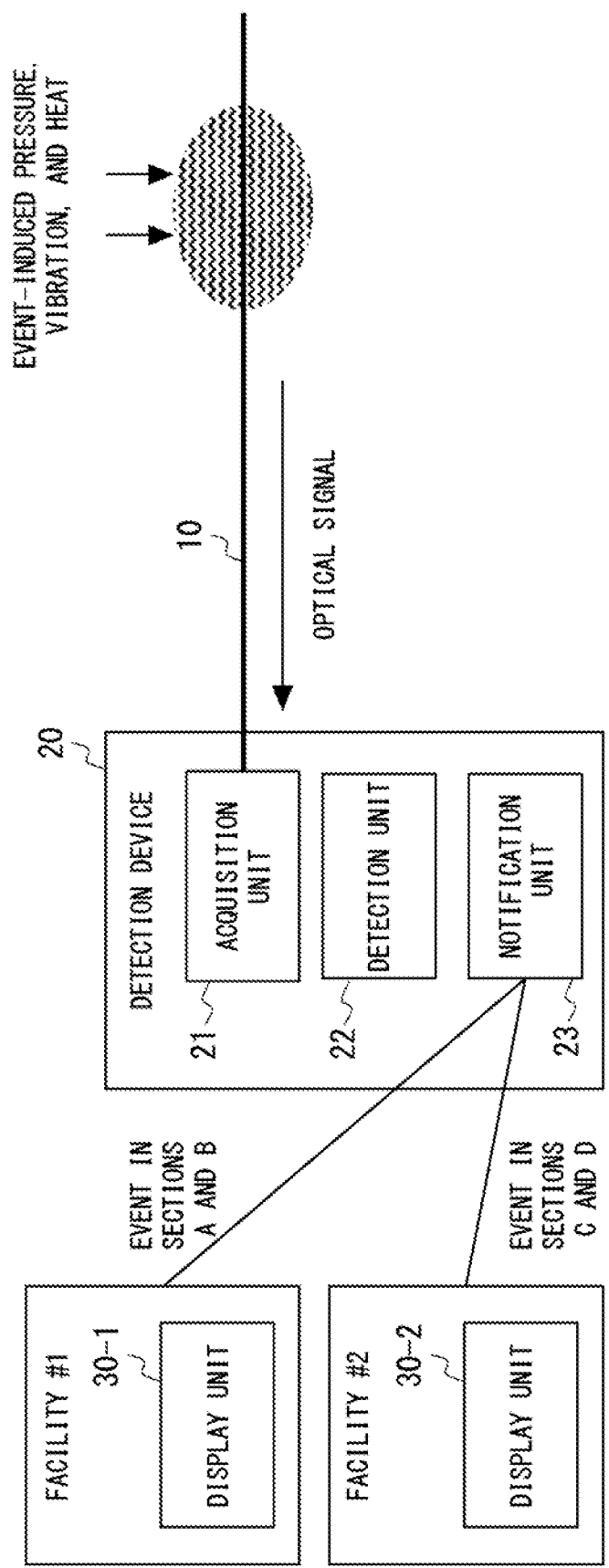
FIG. 11 is a diagram illustrating a modified configuration example of the detection system according to the second example embodiment.

In such a case, the notification destination of the notification unit 23 may be different for each section. In the example of FIG. 11, the notification destination of an event occurring in the sections A and B is a display unit 30-1 provided in facility #1, and the notification destination of an event occurring in the sections C and D is a display unit 30-2 provided in facility #2. In the example of FIG. 11, the notification method of the notification unit 23 is a method for displaying a GUI screen on the display units 30-1 and 30-2. However, the notification method of the notification unit 23 may be a method for outputting a message from a speaker (not illustrated) by voice.

Third Example Embodiment

A detection system according to the present third example embodiment detects an intrusion act, such as tunnel excavation or in-tunnel movement, as an event in the vicinity of the optical fiber 10. The basic configuration and operation of the detection system according to the present third example embodiment are the same as those of the first and second example embodiments described above.

Figure 12:
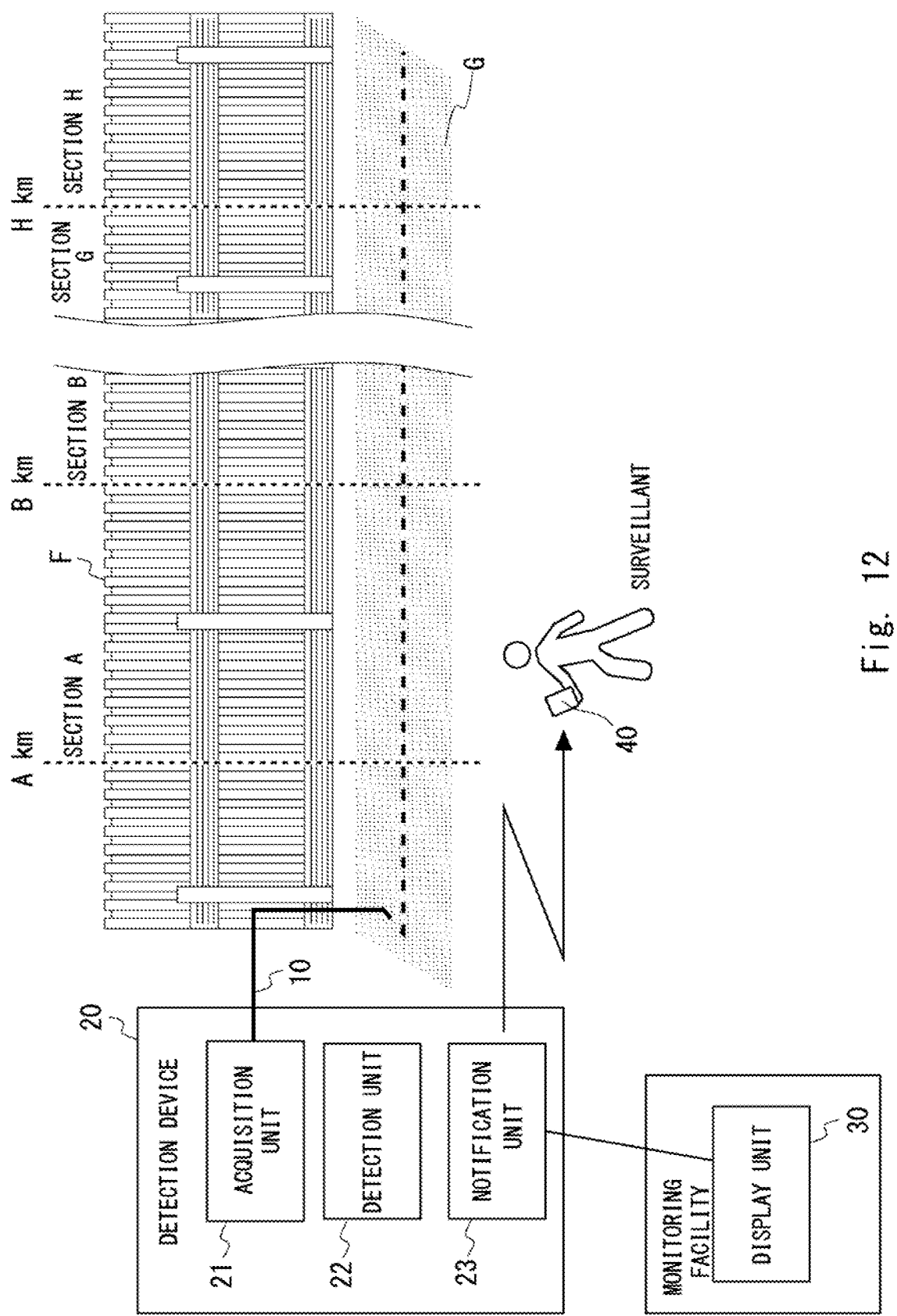
FIG. 12 is a diagram illustrating a configuration example of a detection system according to a third example embodiment.

As illustrated in FIG. 12, in the detection system according to the present third example embodiment, the optical fiber 10 is laid in an underground G along a border, a boundary between a site and the outside, and the like. When the optical fiber 10 is laid in the underground G, the optical fiber 10 may be laid inside a pipe provided in the underground G or may be laid directly in the underground G. However, the method of laying the optical fiber 10 is not limited thereto. For example, when a fence F, a wall, or the like is installed along a border or the like, the optical fiber 10 may be attached to the fence F, the wall, or the like.

A position where an intrusion act has occurred gradually approaches the optical fiber 10. By using this, the detection unit 22 detects the intrusion act when a displacement between the first environment pattern and the second environment pattern shows an increasing tendency of vibration.

When the detection unit 22 has detected the intrusion act, the notification unit 23 notifies a monitoring facility of the occurrence of the intrusion act and a section where the intrusion act has occurred. Furthermore, the notification unit 23 may specify a surveillant in the section where the intrusion act has occurred, and notify the specified surveillant of the occurrence of the intrusion act and the section where the intrusion act has occurred. In the example of FIG. 12, it is assumed that the notification method of the notification unit 23 is a method for displaying a GUI screen on a display unit 30 in the monitoring facility or a terminal 40 owned by the surveillant. However, the notification method of the notification unit 23 may be a method for outputting a message from a speaker (not illustrated) by voice.

Subsequently, hereinafter, a specific example of an environment pattern generation operation performed by the acquisition unit 21 and an environment pattern comparison operation performed by the detection unit 22 will be described.

(B) Specific Example when Detecting Tunnel Excavation

First, a specific example of an environment pattern generation operation performed by the acquisition unit 21 and an environment pattern comparison operation performed by the detection unit 22 when detecting tunnel excavation will be described with reference to FIG. 13. In the example of FIG. 13, environment information indicating the magnitude [nm] of vibration of the optical fiber 10 is used.

(B-1) Specific Example of Environment Pattern Generation Operation Performed by Acquisition Unit 21 when Detecting Tunnel Excavation As illustrated in FIG. 13, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

In the case of tunnel excavation, it is conceivable that the environment information gradually changes over a long period of time. Therefore, it is assumed that the first period and the second period are long periods (for example, one day, half a day, or the like).

(B-2) Specific Example of Environment Pattern Comparison Operation Performed by Detection Unit 22 when Detecting Tunnel Excavation In the example of FIG. 13, it is assumed that the sum of average values of each of the three pieces of environment information is used as the first environment pattern and the second environment pattern. In such a case, the first environment pattern is 32 nm, while the second environment pattern is 49 nm.

The detection unit 22 compares the first environment pattern and the second environment pattern. As a result of the comparison, a displacement between the first environment pattern and the second environment pattern shows an increasing tendency of vibration. Therefore, the detection unit 22 detects the tunnel excavation.

(C) Specific Example when Detecting In-Tunnel Movement

Subsequently, a specific example of an environment pattern generation operation performed by the acquisition unit 21 and an environment pattern comparison operation performed by the detection unit 22 when detecting in-tunnel movement will be described with reference to FIG. 14. In the example of FIG. 14, environment information indicating the magnitude [nm] of vibration of the optical fiber 10 is used.

(C-1) Specific Example of Environment Pattern Generation Operation Performed by Acquisition Unit 21 when Detecting In-Tunnel Movement As illustrated in FIG. 14, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

In the case of in-tunnel movement, it is conceivable that the environment information changes in a short period of time. Therefore, it is assumed that the first period and the second period are short periods (for example, 30 minutes, 10 minutes, or the like).

(C-2) Specific Example of Environment Pattern Comparison Operation Performed by Detection Unit 22 when Detecting In-Tunnel Movement In the example of FIG. 14, the first period and the second period are short. Therefore, when average values of the three pieces of environment information are used as the first environment pattern and the second environment pattern, the fluctuation of the environment pattern due to a disturbance may appear significantly. On the other hand, even though the first period and the second period are short, when it is a minimum value, it is possible to prevent an influence of a disturbance.

Accordingly, in the example of FIG. 14, it is assumed that minimum values of the three pieces of environment information are used as the first environment pattern and the second environment pattern. In such a case, the first environment pattern is 3 nm, while the second environment pattern is 6 nm.

The detection unit 22 compares the first environment pattern and the second environment pattern. As a result of the comparison, a displacement between the first environment pattern and the second environment pattern shows an increasing tendency of vibration. Therefore, the detection unit 22 detects the in-tunnel movement.

As described above, according to the present third example embodiment, the detection unit 22 uses the fact that a position where an intrusion act has occurred gradually approaches the optical fiber 10, and detects an intrusion act when a displacement between the first environment pattern and the second environment pattern shows an increasing tendency of vibration. This makes it possible to detect an intrusion act by distinguishing an event (construction in the neighborhood, parallel movement of surveillants on the ground, or the like) in which vibration is constant or an event (earthquakes, accidents, shootings, or the like) in which vibration occurs instantaneously.

Modification of Third Example Embodiment

When a displacement between the first environment pattern and the second environment pattern shows an increasing tendency of vibration and then shows a decreasing tendency of vibration, the detection unit 22 may detect that a position where an intrusion act has occurred has exceeded a boundary such as a border.

Figure 15:
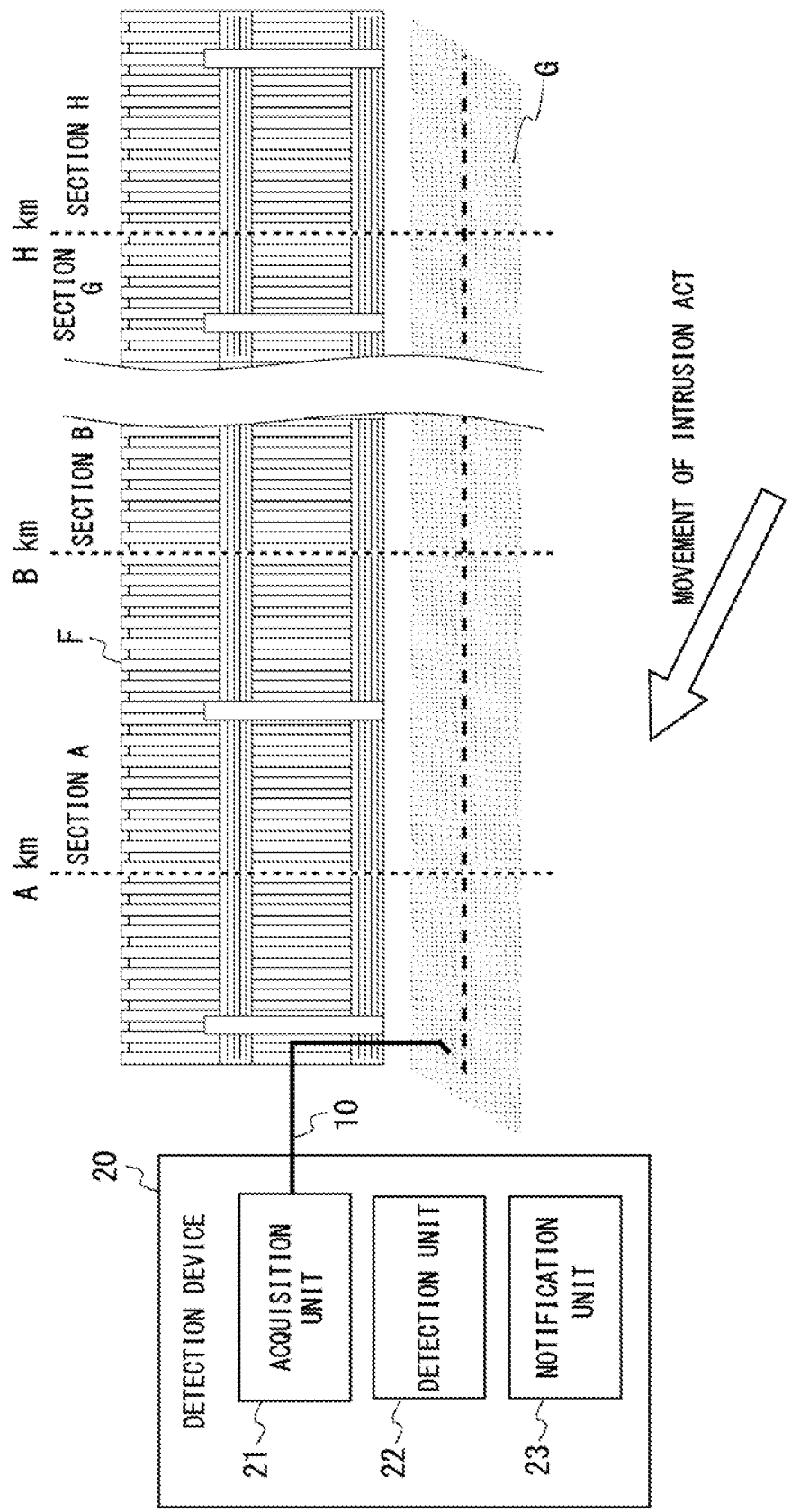
FIG. 15 is a diagram illustrating a modified operation example of the detection system according to the third example embodiment.

Furthermore, the detection unit 22 may compare displacements for each section and derive the movement direction of a position where an intrusion act has occurred. For example, it is assumed that a state in which a displacement in the section B is larger than that in the section A has shifted to a state in which the displacement in the section A is larger than that in the section B, and the magnitude relationship of the displacement has changed between the section A and the section B. In such a case, as illustrated in FIG. 15, the detection unit 22 can detect that a position where an intrusion act has occurred is laterally moving from the section B toward the section A.

Fourth Example Embodiment

A detection system according to the present fourth example embodiment detects the deterioration of a pipeline as an event in the vicinity of the optical fiber 10. The basic configuration and operation of the detection system according to the present fourth example embodiment are the same as those of the first and second example embodiments described above.

Figure 16:
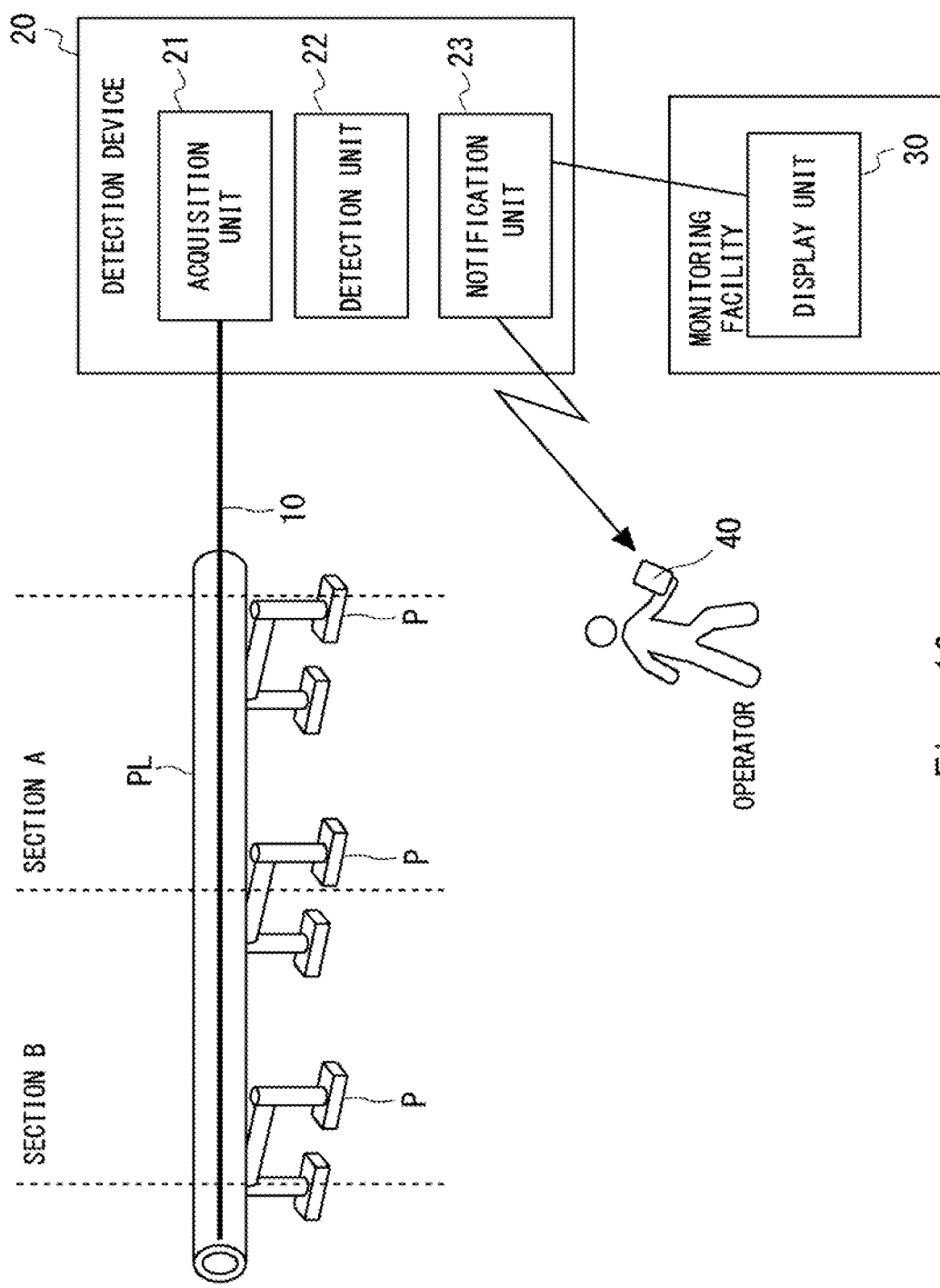
FIG. 16 is a diagram illustrating a configuration example of a detection system according to a fourth example embodiment.

As illustrated in FIG. 16, in the detection system according to the present fourth example embodiment, the optical fiber 10 is attached to a pipeline PL. In the example of FIG. 16, the optical fiber 10 having a straight line shape passes through the inside of the pipeline PL along the pipeline PL, but the attachment method of the optical fiber 10 is not limited thereto. For example, the optical fiber 10 may be spiral, or may creep inside or outside of the pipeline PL along the pipeline PL. Furthermore, the pipeline PL is supported by three pillars P and laid on the ground, but may be laid at any place such as a ground, an underground, a ceiling, a floor, and a wall.

As the pipeline PL deteriorates, the vibration increases. By using this, the detection unit 22 detects the deterioration of the pipeline PL when a displacement between the first environment pattern and the second environment pattern shows an increasing tendency of vibration.

Furthermore, as the pipeline PL deteriorates, clogging or the like occurs, and thus the temperature rises. By using this, the detection unit 22 detects the deterioration of the pipeline PL when the displacement between the first environment pattern and the second environment pattern shows an increasing tendency of temperature.

When the detection unit 22 detects the deterioration of the pipeline PL, the notification unit 23 notifies a monitoring facility of the occurrence of the deterioration of the pipeline PL and a position where the deterioration has occurred. Furthermore, the notification unit 23 may specify an operator near the position where the deterioration has occurred, and notify the specified operator of the occurrence of the deterioration of the pipeline PL and the position where the deterioration has occurred. In the example of FIG. 16, it is assumed that the notification method of the notification unit 23 is a method for displaying a GUI screen on the display unit 30 in the monitoring facility or the terminal 40 owned by the operator. However, the notification method of the notification unit 23 may be a method for outputting a message from a speaker (not illustrated) by voice.

Subsequently, hereinafter, two specific examples of an environment pattern generation operation performed by the acquisition unit 21 and an environment pattern comparison operation performed by the detection unit 22 when detecting the deterioration of the pipeline PL will be described.

(D1) First Specific Example when Detecting Deterioration of Pipeline PL

First, a first specific example of an environment pattern generation operation performed by the acquisition unit 21 and an environment pattern comparison operation performed by the detection unit 22 when detecting the deterioration of the pipeline PL will be described with reference to FIG. 17. In the example of FIG. 17, environment information indicating the magnitude [nm] of vibration of the optical fiber 10 is used.

(D1-1) First Specific Example of Environment Pattern Generation Operation Performed by Acquisition Unit 21 when Detecting Deterioration of Pipeline PL As illustrated in FIG. 17, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

In the case of the deterioration of the pipeline PL, it is conceivable that the environment information gradually changes over a long period of time. Therefore, it is assumed that the first period and the second period are long periods (for example, one week, one day, or the like).

(D1-2) First Specific Example of Environment Pattern Comparison Operation Performed by Detection Unit 22 when Detecting Deterioration of Pipeline PL In the example of FIG. 17, it is assumed that the sum of average values of each of the three pieces of environment information is used as the first environment pattern and the second environment pattern. In such a case, the first environment pattern is 26 nm, while the second environment pattern is 38 nm.

The detection unit 22 compares the first environment pattern and the second environment pattern. As a result of the comparison, a displacement between the first environment pattern and the second environment pattern shows an increasing tendency of vibration. Therefore, the detection unit 22 detects the deterioration of the pipeline PL.

(D2) Second Specific Example when Detecting Deterioration of Pipeline PL

Subsequently, a second specific example of an environment pattern generation operation performed by the acquisition unit 21 and an environment pattern comparison operation performed by the detection unit 22 when detecting the deterioration of the pipeline PL will be described with reference to FIG. 18. In the example of FIG. 18, environment information indicating the temperature [° C.] of the optical fiber 10 is used.

(D2-1) Second Specific Example of Environment Pattern Generation Operation Performed by Acquisition Unit 21 when Detecting Deterioration of Pipeline PL As illustrated in FIG. 18, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

It is assumed that the first period and the second period are long periods (for example, one week, one day, or the like), as in the first specific example (D1) described above.

(D2-2) Second Specific Example of Environment Pattern Comparison Operation Performed by Detection Unit 22 when Detecting Deterioration of Pipeline PL In the example of FIG. 18, it is assumed that the sum of average values of each of the three pieces of environment information is used as the first environment pattern and the second environment pattern. In such a case, the first environment pattern is 66° C., while the second environment pattern is 71.5° C.

The detection unit 22 compares the first environment pattern and the second environment pattern. As a result of the comparison, a displacement between the first environment pattern and the second environment pattern shows an increasing tendency of temperature. Therefore, the detection unit 22 detects the deterioration of the pipeline PL.

As described above, according to the present fourth example embodiment, the detection unit 22 uses the fact that the vibration increases as the pipeline PL deteriorates, and detects the deterioration of the pipeline PL when a displacement between the first environment pattern and the second environment pattern shows an increasing tendency of vibration. This makes it possible to detect the deterioration of the pipeline PL by distinguishing an event (operation of peripheral devices, or the like) in which vibration is constant or an event (collision with the pipeline PL, or the like) in which vibration occurs instantaneously.

Alternatively, the detection unit 22 uses the fact that the temperature rises as the pipeline PL deteriorates, and detects the deterioration of the pipeline PL when a displacement between the first environment pattern and the second environment pattern shows an increasing tendency of temperature. This makes it possible to detect the deterioration of the pipeline PL by distinguishing an event (change in outside air temperature) in which temperature changes temporarily.

Modification of Fourth Example Embodiment

In the present fourth example embodiment, the deterioration of the pipeline PL is detected; however, the present disclosure is not limited thereto. For example, the optical fiber 10 may be attached to structures such bridges, buildings, or roads, and the deterioration of these structures may be detected. The method for attaching the optical fiber 10 to these structures may be the same as the method for attaching the pipeline PL.

Fifth Example Embodiment

A detection system according to the present fifth example embodiment detects a sediment disaster as an event in the vicinity of the optical fiber 10. The basic configuration and operation of the detection system according to the present fifth example embodiment are the same as those of the first and second example embodiments described above.

Figure 19:
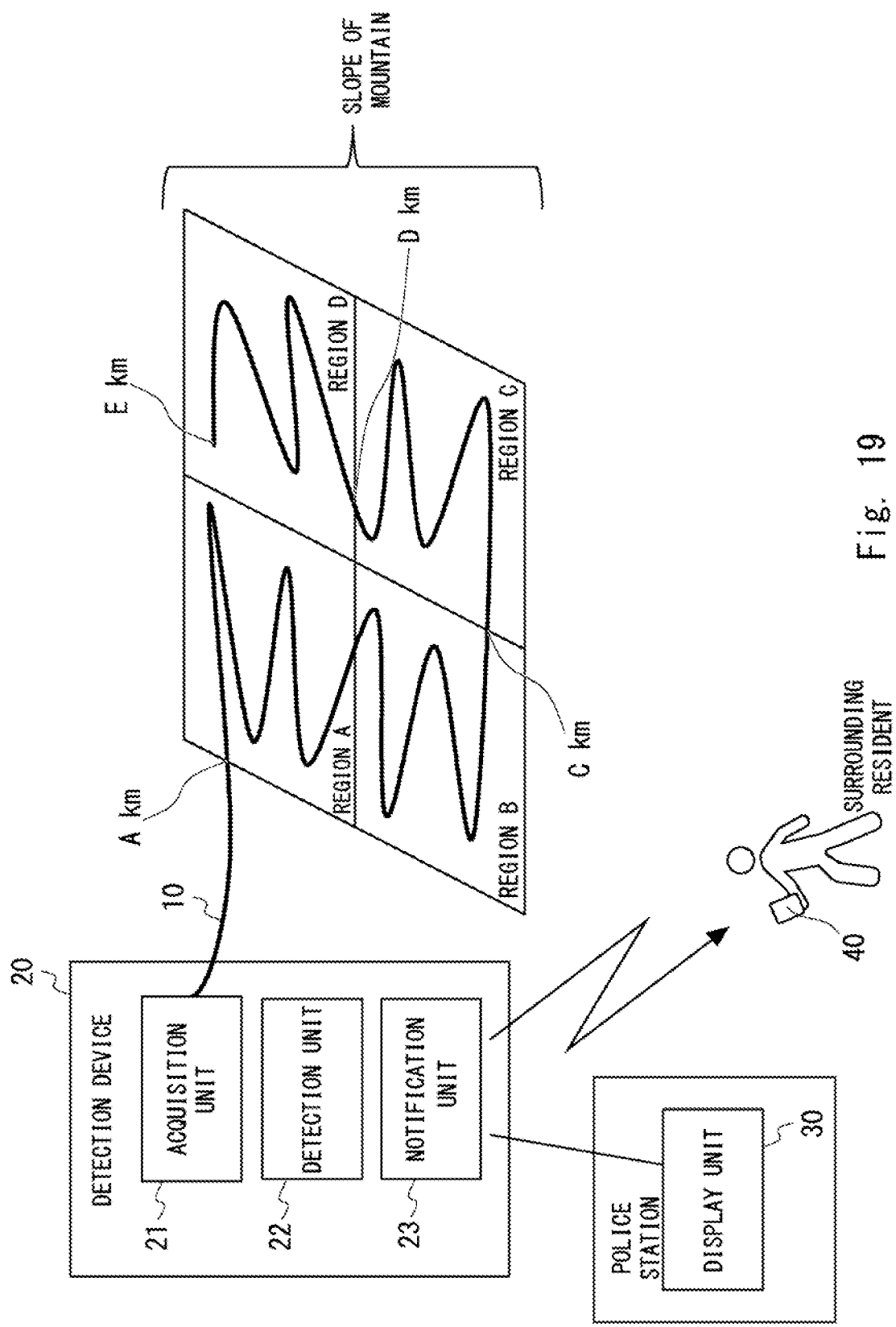
FIG. 19 is a diagram illustrating a configuration example of a detection system according to a fifth example embodiment.

As illustrated in FIG. 19, in the detection system according to the present fifth example embodiment, the optical fiber 10 is laid on the slope of a mountain. Furthermore, the detection system divides a region where the optical fiber 10 is laid into a plurality of regions (four regions from regions A to D in the example of FIG. 19), and defines in advance the vertical positional relationship between the plurality of regions. In the example of FIG. 19, the vertical positional relationship that the region A is located above and the region B is located below is defined, and the vertical positional relationship that the region D is located above and the region C is located below is defined.

As illustrated in FIG. 20, the acquisition unit 21 holds in advance a correspondence table in which the distance from the detection device 20 in the optical fiber 10 and the regions are correlated with each other.

Furthermore, as described above, on the basis of a time difference between transmitting pulsed lights to the optical fiber 10 and receiving optical signals (backscattered lights), the intensity of the received optical signals (backscattered lights), or the like, the acquisition unit 21 can specify a position (distance from the detection device 20 in the optical fiber 10) on the optical fiber 10 where the optical signals have been generated.

Therefore, on the basis of the position on the optical fiber 10 where the optical signals have been generated and the correspondence table illustrated in FIG. 20, the acquisition unit 21 can specify a region on the optical fiber 10 to which environment information included in the optical signals belongs.

When a sediment disaster such as a landslide occurs, the amount of sediment gradually moves downward. By using this, the detection unit 22 detects the sediment disaster when a displacement between the first environment pattern and the second environment pattern shows a decreasing tendency of pressure applied to the optical fiber 10 in an upper region of two regions in the vertical positional relationship and a displacement between the first environment pattern and the second environment pattern shows an increasing tendency of pressure applied to the optical fiber 10 in a lower region thereof.

When the detection unit 22 detects the sediment disaster, the notification unit 23 notifies a police station that has jurisdiction over a position where the sediment disaster has occurred or surrounding residents who live in the vicinity of the position where the sediment disaster has occurred that the sediment disaster has occurred, there is a risk of flooding, or the like. In the example of FIG. 19, it is assumed that the notification method of the notification unit 23 is a method for displaying a GUI screen on the display unit 30 in the police station or the terminal 40 owned by the surrounding resident. However, the notification method of the notification unit 23 may be a method for outputting a message from a speaker (not illustrated) by voice.

Subsequently, hereinafter, a specific example of an environment pattern generation operation performed by the acquisition unit 21 and an environment pattern comparison operation performed by the detection unit 22 when detecting the sediment disaster will be described with reference to FIG. 21. In the example of FIG. 21, environment information indicating pressure [nPa] applied to the optical fiber 10 is used and environment information of the two regions A and B in the vertical positional relationship is illustrated.

(E-1) Specific Example of Environment Pattern Generation Operation Performed by Acquisition Unit 21 when Detecting Sediment Disaster As illustrated in FIG. 21, the acquisition unit 21 generates, in the first period, a first environment pattern on the basis of three pieces of environment information respectively correlated with reception timings t1, t2, and t3 at which optical signals have been received from the optical fiber 10 for each of the regions A and B. Similarly in the second period, the acquisition unit 21 generates a second environment pattern on the basis of three pieces of environment information respectively correlated with reception timings t4, t5, and t6 at which optical signals have been received from the optical fiber 10 for each of the regions A and B.

In the case of the sediment disaster, it is conceivable that the environment information gradually changes over a long period of time. Therefore, it is assumed that the first period and the second period are long periods (for example, one week, one day, or the like).

(E-2) Specific Example of Environment Pattern Comparison Operation Performed by Detection Unit 22 when Detecting Sediment Disaster In the example of FIG. 21, it is assumed that the sum of average values of each of the three pieces of environment information is used as the first environment pattern and the second environment pattern. In such a case, in the region A, the first environment pattern is 54 nPa, while the second environment pattern is 42 nPa. In the region B, the first environment pattern is 28.5 nPa, while the second environment pattern is 46 nPa.

The detection unit 22 compares the first environment pattern and the second environment pattern for each of the regions A and B. As a result of the comparison, in the upper region A, a displacement between the first environment pattern and the second environment pattern shows a decreasing tendency of pressure. On the other hand, in the lower region B, a displacement between the first environment pattern and the second environment pattern shows an increasing tendency of pressure. Therefore, the detection unit 22 detects the sediment disaster.

In the example of FIG. 21, the sediment disaster is detected on the basis of the environment patterns of the two regions A and B in the vertical positional relationship, but may be detected on the basis of the environment patterns of the two regions D and C in the vertical positional relationship.

As described above, according to the present fifth example embodiment, the detection unit 22 uses the fact that the amount of sediment gradually moves downward as a sediment disaster such as a landslide occurs, and detects the sediment disaster when a displacement between the first environment pattern and the second environment pattern shows a decreasing tendency of pressure applied to the optical fiber 10 in an upper region and a displacement between the first environment pattern and the second environment pattern shows an increasing tendency of pressure applied to the optical fiber 10 in a lower region. This makes it possible to detect a sediment disaster by distinguishing an event (tunnel construction, building construction, or the like) in which pressure is displaced within only one region or an event (earthquakes or the like) in which pressure occurs instantaneously.

Sixth Example Embodiment

A detection system according to the present sixth example embodiment detects the risk of river flooding as an event in the vicinity of the optical fiber 10. The basic configuration and operation of the detection system according to the present sixth example embodiment are the same as those of the first and second example embodiments described above.

Figure 22:
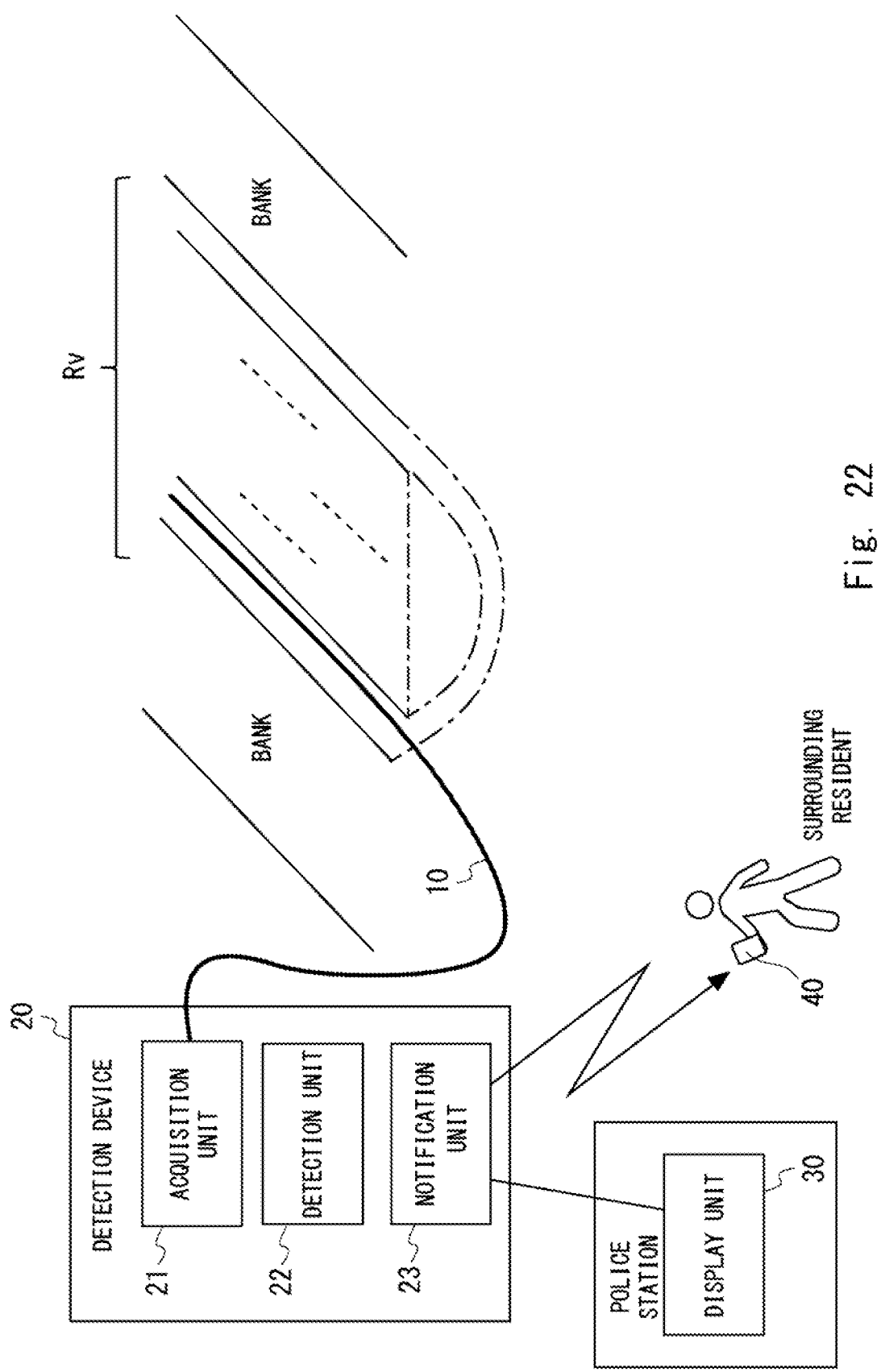
FIG. 22 is a diagram illustrating a configuration example of a detection system according to a sixth example embodiment.

As illustrated in FIG. 22, in the detection system according to the present sixth example embodiment, the optical fiber 10 is laid on the side surface of a river Rv along the longitudinal direction of the river Rv. However, the method for laying the optical fiber 10 is not limited thereto, and for example, the optical fiber 10 may be laid on the bottom surface of the river Rv along the longitudinal direction of the river Rv.

When the risk of flooding of the river Rv increases, the amount of water in the river Rv increases. The increase in the amount of water in the river Rv causes an increase in water pressure. By using this, the detection unit 22 detects the risk of flooding of the river Rv when a displacement between the first environment pattern and the second environment pattern shows an increasing tendency of pressure (water pressure) applied to the optical fiber 10.

When the detection unit 22 detects the risk of flooding of the river Rv, the notification unit 23 notifies a police station that has jurisdiction over a position where there is a risk of flooding of the river Rv or surrounding residents who live in the vicinity of the position that there is a risk of flooding. In the example of FIG. 22, it is assumed that the notification method of the notification unit 23 is a method for displaying a GUI screen on the display unit 30 in the police station or the terminal 40 owned by the surrounding resident. However, the notification method of the notification unit 23 may be a method for outputting a message from a speaker (not illustrated) by voice.

Subsequently, hereinafter, a specific example of an environment pattern generation operation performed by the acquisition unit 21 and an environment pattern comparison operation performed by the detection unit 22 when detecting the risk of flooding of the river Rv will be described with reference to FIG. 23. In the example of FIG. 23, environment information indicating pressure [nPa] applied to the optical fiber 10 is used.

(F-1) Specific Example of Environment Pattern Generation Operation Performed by Acquisition Unit 21 when Detecting Risk of Flooding of River Rv As illustrated in FIG. 23, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

In the case of the flooding of the river Rv, it is conceivable that the environment information changes in a short period of time. Therefore, it is assumed that the first period and the second period are short periods (for example, 1 hour, 30 minutes, or the like).

(F-2) Specific Example of Environment Pattern Comparison Operation Performed by Detection Unit 22 when Detecting Risk of Flooding of River Rv In the example of FIG. 23, the first period and the second period are short.

Therefore, in the example of FIG. 23, it is assumed that minimum values of the three pieces of environment information are used as the first environment pattern and the second environment pattern. The reason for using the minimum values is as described in the third example embodiment described above. In such a case, the first environment pattern is 3 nPa, while the second environment pattern is 5 nPa.

The detection unit 22 compares the first environment pattern and the second environment pattern. As a result of the comparison, a displacement between the first environment pattern and the second environment pattern shows an increasing tendency of pressure. Therefore, the detection unit 22 detects the risk of flooding of the river Rv.

As described above, according to the present sixth example embodiment, the detection unit 22 uses the fact that the amount of water in the river Rv increases as the risk of flooding of the river Rv increases, and detects a sediment disaster when a displacement between the first environment pattern and the second environment pattern shows an increasing tendency of pressure (water pressure) applied to the optical fiber 10. This makes it possible to detect the risk of flooding of the river Rv by distinguishing an event (passage of a ship, or the like) in which water pressure increases instantaneously.

Modification of Sixth Example Embodiment

In the present sixth example embodiment, the risk of flooding of the river Rv is detected; however, the present disclosure is not limited thereto. For example, the optical fiber 10 may be laid at the water gate of a dam, and an increase and decrease in the amount of water in the dam may be detected on the basis of an increasing/decreasing tendency of water pressure according to the flow rate of water passing through the water gate.

Seventh Example Embodiment

A detection system according to the present seventh example embodiment detects road congestion as an event in the vicinity of the optical fiber 10. The basic configuration and operation of the detection system according to the present seventh example embodiment are the same as those of the first and second example embodiments described above.

Figure 24:
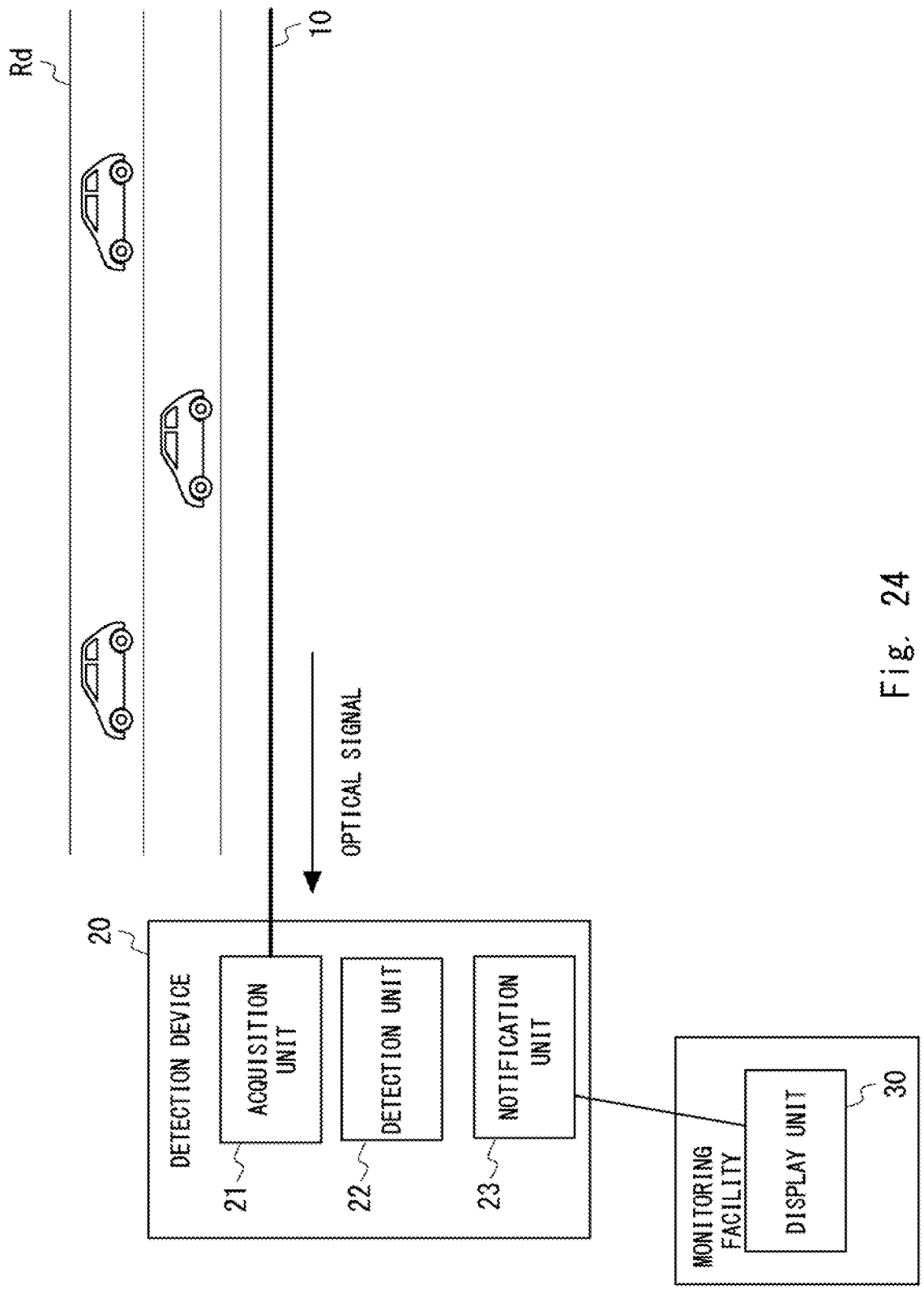
FIG. 24 is a diagram illustrating a configuration example of a detection system according to a seventh example embodiment.

As illustrated in FIG. 24, in the detection system according to the present seventh example embodiment, the optical fiber 10 is laid along a road Rd. The optical fiber 10 may be laid in a straight line shape or a wavy shape along the road Rd. Furthermore, the optical fiber 10 may be laid under the road Rd or may be laid on the side of the road Rd.

When the road Rd is congested, the density of vehicles increases. The increase in the density of vehicles causes an increase in pressure. By using this, the detection unit 22 detects the congestion when a displacement between the first environment pattern and the second environment pattern shows an increasing tendency of pressure.

Furthermore, when the road Rd is congested, the vehicle speed decreases. The decrease in the vehicle speed causes a decrease in vibration. By using this, the detection unit 22 detects the congestion when a displacement between the first environment pattern and the second environment pattern shows a decreasing tendency of vibration.

When the detection unit 22 detects the congestion, the notification unit 23 notifies a management facility of the road Rd of the occurrence of the congestion and a position where the congestion has occurred. In the example of FIG. 24, it is assumed that the notification method of the notification unit 23 is a method for displaying a GUI screen on the display unit 30 in the management facility. However, the notification method of the notification unit 23 may be a method for outputting a message from a speaker (not illustrated) by voice.

Subsequently, hereinafter, two specific examples of an environment pattern generation operation performed by the acquisition unit 21 and an environment pattern comparison operation performed by the detection unit 22 when detecting the congestion of the road Rd will be described.

(G1) First Specific Example when Detecting Congestion of Road Rd

First, a first specific example of an environment pattern generation operation performed by the acquisition unit 21 and an environment pattern comparison operation performed by the detection unit 22 when detecting the congestion of the road Rd will be described with reference to FIG. 25. In the example of FIG. 25, environment information indicating pressure [nPa] applied to the optical fiber 10 is used.

(G1-1) First Specific Example of Environment Pattern Generation Operation Performed by Acquisition Unit 21 when Detecting Congestion of Road Rd As illustrated in FIG. 25, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

In the case of the congestion of the road Rd, it is conceivable that the environment information changes in a short period of time. Therefore, it is assumed that the first period and the second period are short periods (for example, 1 hour, 30 minutes, or the like).

(G1-2) First Specific Example of Environment Pattern Comparison Operation Performed by Detection Unit 22 when Detecting Congestion of Road Rd In the example of FIG. 25, the first period and the second period are short.

Therefore, in the example of FIG. 25, it is assumed that minimum values of the three pieces of environment information are used as the first environment pattern and the second environment pattern. The reason for using the minimum values is as described in the third example embodiment described above. In such a case, the first environment pattern is 10 nPa, while the second environment pattern is 14 nPa.

The detection unit 22 compares the first environment pattern and the second environment pattern. As a result of the comparison, a displacement between the first environment pattern and the second environment pattern shows an increasing tendency of pressure. Therefore, the detection unit 22 detects the congestion.

(G2) Second Specific Example when Detecting Congestion of Road Rd

Subsequently, a second specific example of an environment pattern generation operation performed by the acquisition unit 21 and an environment pattern comparison operation performed by the detection unit 22 when detecting the congestion of the road Rd will be described with reference to FIG. 26. In the example of FIG. 26, environment information indicating the magnitude [nm] of vibration of the optical fiber 10 is used.

(G2-1) Second Specific Example of Environment Pattern Generation Operation Performed by Acquisition Unit 21 when Detecting Congestion of Road Rd As illustrated in FIG. 26, the acquisition unit 21 generates, in the first period, a first environment pattern on the basis of three pieces of environment information respectively correlated with reception timings t1, t2, and t3 at which optical signals have been received from the optical fiber 10. Similarly in the second period, the acquisition unit 21 generates a second environment pattern on the basis of three pieces of environment information respectively correlated with reception timings t4, t5, and t6 at which optical signals have been received from the optical fiber 10.

It is assumed that the first period and the second period are short periods (for example, 1 hour, 30 minutes, or the like), as in the case of the first specific example (G1) described above.

(G2-2) Second Specific Example of Environment Pattern Comparison Operation Performed by Detection Unit 22 when Detecting Congestion of Road Rd In the example of FIG. 26, the first period and the second period are short.

Therefore, in the example of FIG. 26, it is assumed that minimum values of the three pieces of environment information are used as the first environment pattern and the second environment pattern. In such a case, the first environment pattern is 12 nm, while the second environment pattern is 8 nm.

The detection unit 22 compares the first environment pattern and the second environment pattern. As a result of the comparison, a displacement between the first environment pattern and the second environment pattern shows a decreasing tendency of pressure. Therefore, the detection unit 22 detects the congestion.

The detection unit 22 may detect the congestion by combining (G1) and (G2) described above. That is, the detection unit 22 may detect the congestion when a displacement between the first environment pattern and the second environment pattern shows both an increasing tendency of pressure and a decreasing tendency of vibration.

As described above, according to the present seventh example embodiment, the detection unit 22 uses the fact that the density of vehicles increases as the road Rd is congested, and detects congestion when a displacement between the first environment pattern and the second environment pattern shows an increasing tendency of pressure. This makes it possible to detect congestion by distinguishing an event (road construction and the like) in which pressure is constant or an event (earthquakes, passage of a heavy vehicle, or the like) in which pressure occurs instantaneously.

Alternatively, the detection unit 22 uses the fact that the vehicle speed decreases as the road Rd is congested, and detects congestion when a displacement between the first environment pattern and the second environment pattern shows a decreasing tendency of vibration. This makes it possible to detect congestion by distinguishing an event (road construction and the like) in which vibration is constant or an event (earthquakes, passage of a heavy vehicle, or the like) in which vibration occurs instantaneously.

Other Example Embodiments

In the aforementioned example embodiments, regardless of the magnitude of a displacement between the first environment pattern and the second environment pattern, the detection unit 22 determines that the displacement shows an increasing tendency when the second environment pattern is larger than the first environment pattern; however, the present disclosure is not limited thereto. For example, the detection unit 22 may not determine that the displacement shows an increasing tendency when the displacement between the first environment pattern and the second environment pattern is equal to or less than a threshold, and may determine that the displacement shows an increasing tendency when the displacement exceeds the threshold. The same applies when the detection unit 22 determines that the displacement shows a decreasing tendency.

Furthermore, in the aforementioned example embodiments, examples in which the displacement between the first environment pattern and the second environment pattern shows a specific tendency (decreasing tendency or increasing tendency) have been described. However, when there is no displacement or when the displacement is equal to or less than the threshold, the detection unit 22 determines that the displacement shows no specific tendency. When the displacement shows no specific tendency, the detection unit 22 may not detect any event. In such a case, the acquisition unit 21 repeatedly acquires environment information.

Figure 27:
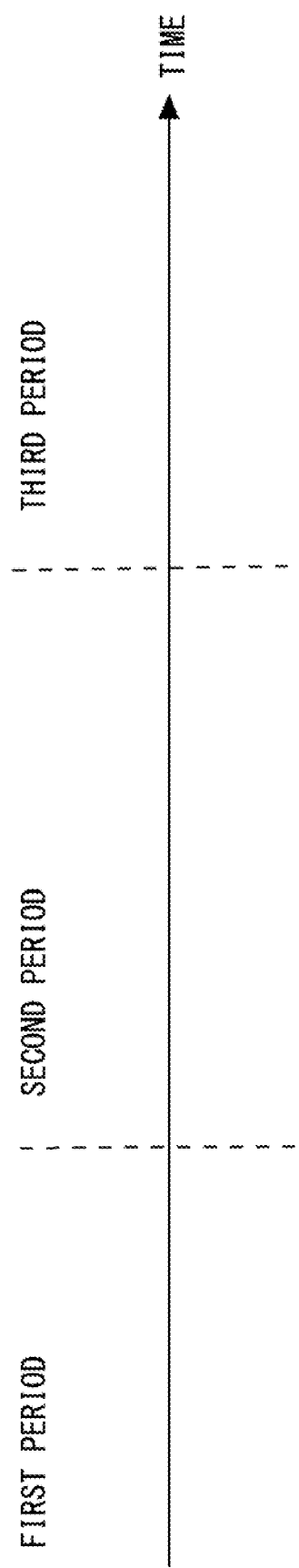
FIG. 27 is a diagram illustrating an example of a period during which a detection unit according to each example embodiment compares environment patterns.

Furthermore, in the aforementioned example embodiments, the detection unit 22 detects an event when a displacement shows a specific tendency by comparing environment patterns (the first environment pattern and the second environment pattern) once; however, the present disclosure is not limited thereto. For example, the detection unit 22 may compare environment patterns a plurality of times, and detect an event when the specific tendency is continuously shown more than a reference number of times or when the specific tendency is shown more than the reference number of times. In such a case, the detection unit 22 may not only compare the environment patterns in a continuous period (for example, the first period and the second period in FIG. 27), but also compare the environment patterns in a non-continuous period (for example, the first period and the third period in FIG. 27).

Furthermore, in the aforementioned example embodiments, the detection device 20 is provided with a plurality of components (the acquisition unit 21, the detection unit 22, and the notification unit 23); however, the present disclosure is not limited thereto. The components provided in the detection device 20 may be provided in one device or may be provided in a plurality of devices in a distributed manner.

<Hardware Configuration of Detection Device>

Subsequently, hereinafter, the hardware configuration of a computer 50 that implements the detection device 20 according to the aforementioned each example embodiment will be described with reference to FIG. 28.

Figure 28:
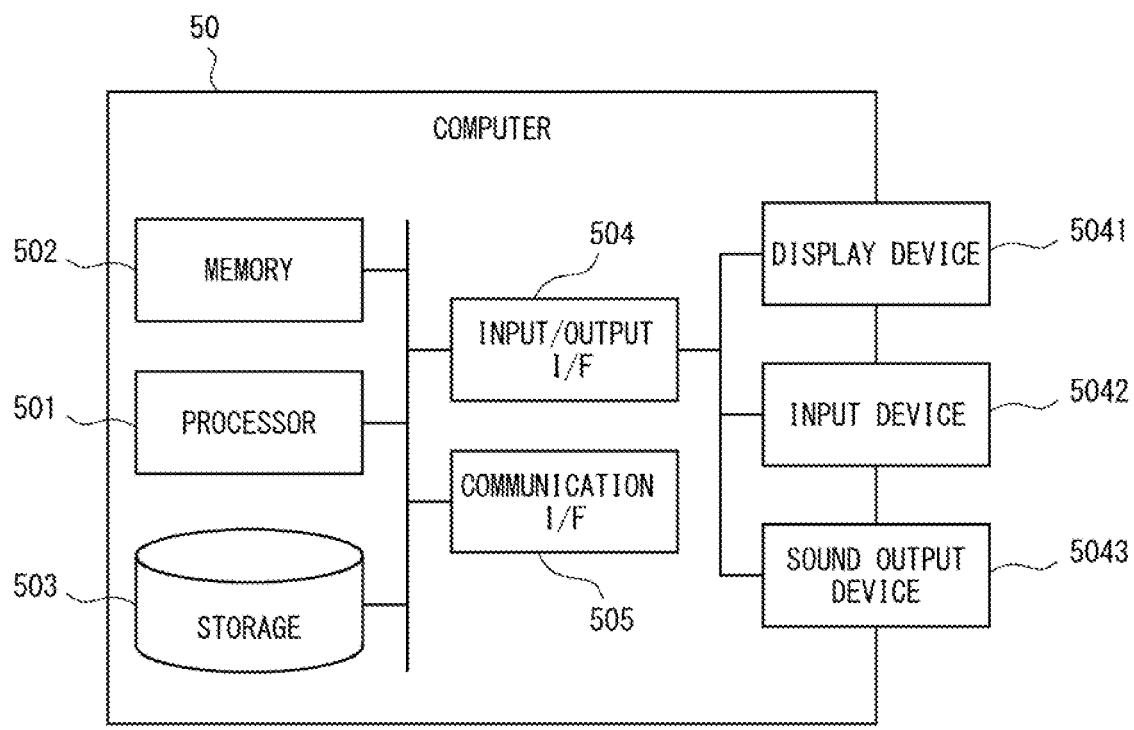
FIG. 28 is a block diagram illustrating an example of a hardware configuration of a computer that implements a detection device according to each example embodiment.

As illustrated in FIG. 28, the computer 50 includes a processor 501, a memory 502, a storage 503, an input/output interface (input/output I/F) 504, a communication interface (communication I/F) 505, and the like. The processor 501, the memory 502, the storage 503, the input/output I/F 504, and the communication I/F 505 are connected by a data transmission path for transmitting/receiving data to/from each other.

The processor 501 is, for example, an arithmetic processing device such as a central processing unit (CPU) or a graphics processing unit (GPU). The memory 502 is, for example, a memory such as a random access memory (RAM) or a read only memory (ROM). The storage 503 is, for example, a storage device such as a hard disk drive (HDD), a solid state device (SSD), or a memory card. Furthermore, the storage 503 may be a memory such as a RAM or a ROM.

The storage 503 stores programs that implement the functions of the components (the acquisition unit 21, the detection unit 22, and the notification unit 23) provided in the detection device 20. The processor 501 executes these programs, thereby implementing the functions of the components provided in the detection device 20, respectively. When executing each of the above programs, the processor 501 may read these programs onto the memory 502 and then execute the programs, or may execute the programs without reading the programs onto the memory 502. The memory 502 and the storage 503 also play a role of storing information and data held by the components provided in the detection device 20.

The aforementioned program can be stored using various types of non-transitory computer readable media, and supplied to a computer (including the computer 50). The non-transitory computer readable medium includes various types of tangible storage media. Examples of the non-transitory computer readable medium include a magnetic recording medium (for example, a flexible disk, a magnetic tape, a hard disk drive), a magneto-optical recording medium (for example, a magneto-optical disk), a compact disc-read only memory (CD-ROM), a compact disc-recordable (CD-R), a compact disc-rewritable (CD-R/W), and a semiconductor memory (for example, a mask ROM, a programmable read only memory (PROM), an erasable programmable read only memory (EPROM), a flash ROM, and a RAM). Furthermore, the program may also be supplied to the computer by various types of transitory computer readable media. Examples of the transitory computer readable medium include an electrical signal, an optical signal, and an electromagnetic wave. The transitory computer readable medium can supply the program to the computer via a wired communication path such as an electric wire and an optical fiber or a wireless communication path.

The input/output I/F 504 is connected to a display device 5041, an input device 5042, a sound output device 5043, and the like. The display device 5041 is a device that displays a screen associated to drawing data processed by the processor 501, such as a liquid crystal display (LCD), a cathode ray tube (CRT) display, or a monitor. The input device 5042 is a device that receives operation input of an operator, and is, for example, a keyboard, a mouse, a touch sensor, and the like. The display device 5041 and the input device 5042 may be integrated and implemented as a touch panel. The sound output device 5043 is a device that acoustically outputs sound associated to acoustic data processed by the processor 501, such as a speaker.

The communication I/F 505 transmits/receives data to/from an external device. For example, the communication I/F 505 communicates with the external device via the wired communication path or the wireless communication path.

Although the present disclosure has been described with reference to the example embodiments, the present disclosure is not limited to the example embodiments described above. Various changes that can be understood by a person skilled in the art can be made to the configuration and details of the present disclosure within the scope of the present disclosure.

For example, some or all of the aforementioned example embodiments may be used in combination with each other.

Furthermore, some or all of the above example embodiments may be described as in the supplementary notes, but are not limited to the following.

(Supplementary Note 1)
A detection system including
an optical fiber configured to detect environment information,
an acquisition unit configured to acquire the environment information being included in an optical signal received from the optical fiber, and
a detection unit configured to detect an event in a vicinity of the optical fiber, based on a first environment pattern based on environment information acquired from an optical signal associated to a first period and a second environment pattern based on environment information acquired from an optical signal associated to a second period.

(Supplementary Note 2)
The detection system according to the supplementary note 1, wherein the acquisition unit generates the first environment pattern by integrating the environment information acquired from an optical signal associated to the first period, and generates the second environment pattern by integrating the environment information acquired from an optical signal associated to the second period.

(Supplementary Note 3)
The detection system according to the supplementary note 1 or 2, wherein the detection unit detects an event in a vicinity of the optical fiber, based on a displacement between the first environment pattern and the second environment pattern.

(Supplementary Note 4)
The detection system according to any one of the supplementary notes 1 to 3, wherein
the acquisition unit acquires, from the optical signals received from a plurality of sections in the optical fiber, the environment information for each of the sections, and generates the first environment pattern and the second environment pattern for each of the sections, and
the detection unit detects an event in a vicinity of the optical fiber for each of the sections, based on the first environment pattern and the second environment pattern.

(Supplementary Note 5)
The detection system according to the supplementary note 4, wherein the detection unit derives a displacement between the first environment pattern and the second environment pattern for each of the sections, detects an event in a vicinity of the optical fiber for each of the sections, based on the displacement, and specifies a section with the largest displacement.

(Supplementary Note 6)
The detection system according to any one of the supplementary notes 1 to 3, wherein the acquisition unit acquires, from the optical signals received from a plurality of sections in the optical fiber, the environment information for each of the sections, and generates the first environment pattern and the second environment pattern for each of the sections, and
the detection unit derives a displacement between the first environment pattern and the second environment pattern, and detects an event in a vicinity of the optical fiber, based on a difference in the displacements in different sections.

(Supplementary Note 7)
The detection system according to any one of the supplementary notes 1 to 6, wherein the acquisition unit acquires the environment information indicating at least one of temperature of the optical fiber, vibration of the optical fiber, and pressure applied to the optical fiber.

(Supplementary Note 8)
The detection system according to any one of the supplementary notes 1 to 7, further including a notification unit configured to notify that the detection unit has detected an event.

(Supplementary Note 9)
The detection system according to any one of the supplementary notes 1 to 5, wherein the detection unit detects an event in a vicinity of the optical fiber, based on the first environment pattern based on environment information acquired from an optical signal received in the first period and the second environment pattern based on environment information acquired from an optical signal received in the second period.

(Supplementary Note 10)
The detection system according to any one of the supplementary notes 1 to 5, wherein the detection unit detects an event in a vicinity of the optical fiber, based on the first environment pattern based on environment information acquired from backscattered light generated in the optical fiber by light emitted in the first period and the second environment pattern based on environment information acquired from backscattered light generated in the optical fiber by light emitted in in the second period.

(Supplementary Note 11)
A detection method by a detection system, including
an acquisition step of acquiring environment information being included in an optical signal received from an optical fiber that detects the environment information; and
a detection step of detecting an event in a vicinity of the optical fiber, based on a first environment pattern based on environment information acquired from an optical signal associated to a first period and a second environment pattern based on environment information acquired from an optical signal associated to a second period.

(Supplementary Note 12)

The detection method according to the supplementary note 11, wherein, in the acquisition step, the first environment pattern is generated by integrating the environment information acquired from an optical signal associated to the first period, and the second environment pattern is generated by integrating the environment information acquired from an optical signal associated to the second period.

(Supplementary Note 13)

The detection method according to the supplementary note 11 or 12, wherein, in the detection step, an event in a vicinity of the optical fiber is detected based on a displacement between the first environment pattern and the second environment pattern.

(Supplementary Note 14)

The detection method according to any one of the supplementary notes 11 to 13, wherein,
  in the acquisition step, from the optical signals received from a plurality of sections in the optical fiber, the environment information is acquired for each of the sections, and the first environment pattern and the second environment pattern are generated for each of the sections, and,
  in the detection step, an event in a vicinity of the optical fiber is detected for each of the sections, based on the first environment pattern and the second environment pattern.

(Supplementary Note 15)

The detection method according to the supplementary note 14, wherein, in the detection step, a displacement between the first environment pattern and the second environment pattern is derived for each of the sections, an event in a vicinity of the optical fiber is detected for each of the sections, based on the displacement, and a section with the largest displacement is specified.

(Supplementary Note 16)

The detection method according to any one of the supplementary notes 11 to 13, wherein,
  in the acquisition step, from the optical signals received from a plurality of sections in the optical fiber, the environment information is acquired for each of the sections, and the first environment pattern and the second environment pattern are generated for each of the sections, and,
  in the detection step, a displacement between the first environment pattern and the second environment pattern is derived, and an event in a vicinity of the optical fiber is detected based on a difference in the displacements in different sections.

(Supplementary Note 17)

The detection method according to any one of the supplementary notes 11 to 16, wherein, in the acquisition step, the environment information indicating at least one of temperature of the optical fiber, vibration of the optical fiber, and pressure applied to the optical fiber is acquired.

(Supplementary Note 18)

The detection method according to any one of the supplementary notes 11 to 17, further including a notification step of notifying that an event has been detected in the detection step.

(Supplementary Note 19)

The detection method according to any one of the supplementary notes 11 to 15, wherein, in the detection step, an event in a vicinity of the optical fiber is detected, based on the first environment pattern based on environment information acquired from an optical signal received in the first period and the second environment pattern based on environment information acquired from an optical signal received in the second period.

(Supplementary Note 20)

The detection method according to any one of the supplementary notes 11 to 15, wherein, in the detection step, an event in a vicinity of the optical fiber is detected, based on the first environment pattern based on environment information acquired from backscattered light generated in the optical fiber by light emitted in the first period and the second environment pattern based on environment information acquired from backscattered light generated in the optical fiber by light emitted in the second period.

(Supplementary Note 21)

A detection device including
  an acquisition unit configured to acquire environment information included in an optical signal received from an optical fiber that detects the environment information; and
  a detection unit configured to detect an event in a vicinity of the optical fiber, based on a first environment pattern based on environment information acquired from an optical signal associated to a first period and a second environment pattern based on environment information acquired from an optical signal associated to a second period.

REFERENCE SIGNS LIST

10 Optical fiber
20 Detection device
21 Acquisition unit
22 Detection unit
23 Notification unit
30, 30-1, 30-2 Display unit
40 Terminal
50 Computer
501 Processor
502 Memory
503 Storage
504 Input/output interface
5041 Display device
5042 Input device
5043 Sound output device
505 Communication interface
F Fence
G Underground
PL Pipeline
Rv River
Rd Road

The invention claimed is:

1. A detection system comprising:
  an optical fiber having a plurality of sections and configured to detect environment information;
  a memory storing instructions; and
  at least one processor configured to execute the instructions to:
    acquire, for each section, first and second environment information included in first and second optical signals received from the optical fiber and associated with first and second periods, respectively;
    derive, for each section, a displacement between a first environment pattern based on the first environment information and a second environment pattern based on the second environment information;
    detect, when the displacement for more than one section satisfies a predetermined condition, an event in a vicinity of the optical fiber that is associated with the predetermined condition; and specify the section for which the displacement satisfying the predetermined condition is largest as being near a position where the event is occurring.

2. The detection system according to claim 1, wherein the processor is configured to execute the instructions to:
generate the first environment pattern by integrating the first environment information; and
generate the second environment pattern by integrating the second environment information.

3. The detection system according to claim 1, wherein the at least one processor is configured to execute the instructions to
detect the event based on a difference in the displacements in different sections.

4. The detection system according to claim 1, wherein the environment information indicates at least one of temperature of the optical fiber, vibration of the optical fiber, and pressure applied to the optical fiber.

5. The detection system according to claim 1, wherein the at least one processor is configured to execute the instructions to notify that the event has been detected.

6. The detection system according to claim 1, wherein the environment information is detected from backscattered light generated in the optical fiber by emitted light.

7. A detection method performed by a detection system and comprising:
acquiring, for each section of a plurality of sections of an optical fiber configured to detect environment information, first and second environment information included in first and second optical signals received from the optical fiber and associated with first and second periods, respectively;
deriving, for each section, a displacement between a first environment pattern based on the first environment information and a second environment pattern based on the second environment information;
detecting, when the displacement for more than one section satisfies a predetermined condition, an event in a vicinity of the optical fiber that is associated with the predetermined condition; and
specifying the section for which the displacement satisfying the predetermined condition is largest as being near a position where the event is occurring.

8. The detection method according to claim 7, comprising:
generating the first environment pattern by integrating the first environment information and
generating the second environment pattern by integrating the environment information.

9. The detection method according to claim 7, comprising detecting the event based on a difference in the displacements in different sections.

10. The detection method according to claim 7, wherein the environment information indicates at least one of temperature of the optical fiber, vibration of the optical fiber, and pressure applied to the optical fiber is acquired.

11. The detection method according to claim 7, further comprising notifying that the event has been detected.

12. A detection device comprising:
a memory storing instructions; and
at least one processor configured to execute the instructions to:
acquire, for each section of a plurality of sections of an optical fiber configured to detect environment information, first and second environment information included in first and second optical signals received from the optical fiber and associated with first and second periods, respectively;
derive, for each section, a displacement between a first environment pattern based on the first environment information and a second environment pattern based on the second environment information;
detect, when the displacement for more than one section satisfies a predetermined condition, an event in a vicinity of the optical fiber that is associated with the predetermined condition; and
specify the section for which the displacement satisfying the predetermined condition is largest as being near a position where the event is occurring.

* * * * *